United States Patent
Phang et al.

(10) Patent No.: US 9,247,303 B2
(45) Date of Patent: Jan. 26, 2016

(54) DISPLAY APPARATUS AND USER INTERFACE SCREEN PROVIDING METHOD THEREOF

(71) Applicant: SAMSUNG ELECTRONICS CO., LTD., Suwon-si (KR)

(72) Inventors: Joon-ho Phang, Seoul (KR); Joo-sun Moon, Seoul (KR); Hong-pyo Kim, Goyang-si (KR); Yi-sak Park, Seoul (KR); Christopher E. Bangle, Clavesana (IT)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/274,287

(22) Filed: May 9, 2014

(65) Prior Publication Data

US 2014/0337892 A1    Nov. 13, 2014

(30) Foreign Application Priority Data

May 10, 2013  (KR) .................. 10-2013-0053437

(51) Int. Cl.
*G06F 3/00* (2006.01)
*G06F 13/00* (2006.01)
(Continued)

(52) U.S. Cl.
CPC ............ *H04N 21/478* (2013.01); *G06F 3/0484* (2013.01); *G06F 3/04815* (2013.01); *G06F 3/04817* (2013.01); *H04N 21/4312* (2013.01); *H04N 21/4316* (2013.01); *H04N 21/472* (2013.01); *H04N 21/47202* (2013.01); *H04N 21/47205* (2013.01); *H04N 21/47217* (2013.01); *H04N 21/482* (2013.01); *H04N 21/4882* (2013.01)

(58) Field of Classification Search
USPC .............................................. 725/38, 44, 52
See application file for complete search history.

(56) References Cited

U.S. PATENT DOCUMENTS 6,002,403 A    12/1999  Sugiyama et al.
6,411,337 B2 *  6/2002  Cove et al. .................... 348/563
(Continued)

FOREIGN PATENT DOCUMENTS

EP          2363792 A1    9/2011
KR    2001-0100342 A    11/2001
(Continued)

OTHER PUBLICATIONS

International Search Report dated Aug. 18 2014 issued by International Searching Authority in counterpart International Application No. PCT/KR2014/004092.
(Continued)

*Primary Examiner* — Pankaj Kumar
*Assistant Examiner* — Charles N Hicks
(74) *Attorney, Agent, or Firm* — Sughrue Mion, PLLC

(57) ABSTRACT

A display apparatus comprising a display configured to display a plurality of spaces in a form of a polyhedron is provided. The plurality of spaces each correspond to a different category. The apparatus displays a rotatable Graphical User Interface (GUI), a user interface is configured to receive a user interaction for the GUI, and a controller is configured to, when one of the plurality of spaces in a form of a polyhedron is selected as the GUI is rotated according to the user interaction, control to display a selected space as a main space, and display at least one content-related information included in a category corresponding to the selected space.

19 Claims, 20 Drawing Sheets

(51) Int. Cl.
*H04N 5/445* (2011.01)
*H04N 21/478* (2011.01)
*H04N 21/472* (2011.01)
*H04N 21/482* (2011.01)
*H04N 21/488* (2011.01)
*H04N 21/431* (2011.01)
*G06F 3/0481* (2013.01)
*G06F 3/0484* (2013.01)

(56) References Cited

U.S. PATENT DOCUMENTS

| | | | |
|---|---|---|---|
| 7,007,242 | B2 | 2/2006 | Suomela et al. |
| 7,743,342 | B2 | 6/2010 | Nishijima |
| 7,752,565 | B2 | 7/2010 | Bombolowsky et al. |
| 8,060,826 | B2 | 11/2011 | Park |
| 8,115,869 | B2 | 2/2012 | Rathod et al. |
| 8,117,563 | B2 | 2/2012 | Ok et al. |
| 2006/0190965 | A1 | 8/2006 | Lin et al. |
| 2010/0058248 | A1 | 3/2010 | Park |
| 2010/0315417 | A1* | 12/2010 | Cho et al. .................. 345/419 |
| 2011/0093889 | A1* | 4/2011 | Araki et al. .................. 725/37 |
| 2011/0131502 | A1 | 6/2011 | Ryu et al. |

FOREIGN PATENT DOCUMENTS

| | | |
|---|---|---|
| KR | 10-2006-0013605 A | 2/2006 |
| KR | 10-2008-0064025 A | 7/2008 |
| KR | 10-2008-0079501 A | 9/2008 |
| KR | 10-2010-0010073 A | 2/2010 |
| KR | 10-2010-0081429 A | 7/2010 |
| KR | 10-2010-0122432 A | 11/2010 |
| KR | 10-2011-0012524 A | 2/2011 |
| KR | 10-2011-0038595 A | 4/2011 |
| KR | 10-2011-0061187 A | 6/2011 |
| WO | 01/84461 A1 | 11/2001 |
| WO | 2011043601 A2 | 4/2011 |

OTHER PUBLICATIONS

Written Opinion issued Aug. 18 2014 issued by International Searching Authority in counterpart International Application No. PCT/KR2014/004092.

* cited by examiner

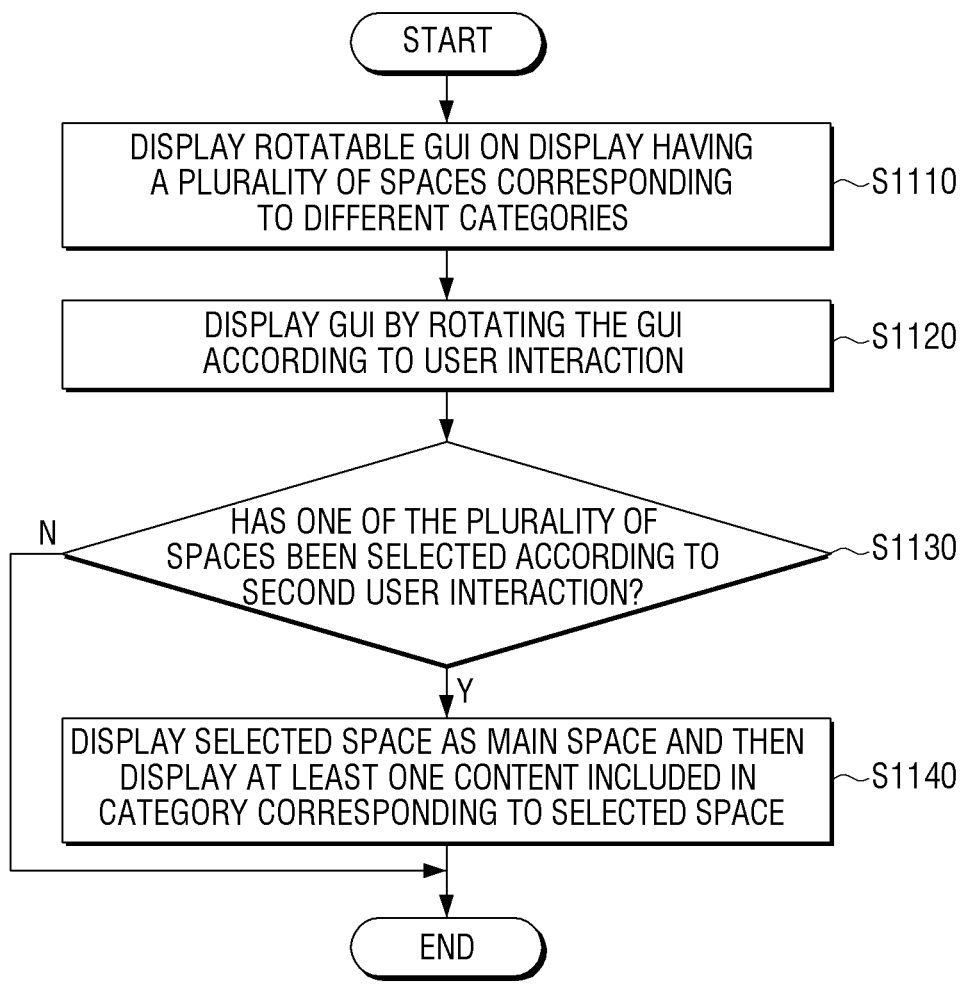

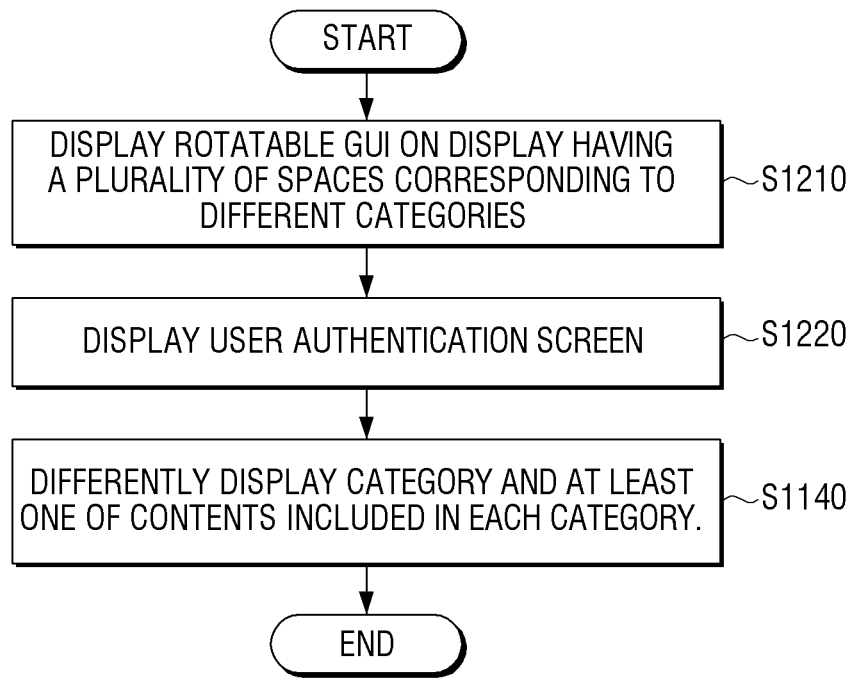

DISPLAY APPARATUS AND USER INTERFACE SCREEN PROVIDING METHOD THEREOF

CROSS-REFERENCE TO RELATED APPLICATIONS

This application claims priority from Korean Patent Application No. 10-2013-0053437, filed on May 10, 2013, in the Korean Intellectual Property Office, the disclosure of which is incorporated herein by reference in its entirety.

BACKGROUND

1. Field

Methods and apparatuses consistent that the exemplary embodiments relate to a display apparatus and a user interface (UI) screen providing method thereof, and more particularly, a display apparatus which provides a three-dimensional (3D) UI screen and a UI screen providing method thereof.

2. Description of the Related Art

With the development of electronic technologies, various types of display devices (or apparatuses) are being developed. Specifically, display devices, such as television (TV) sets, personal computers (PCs), laptop computers, table PCs, mobile phones, MP3 players and the like, are used in most homes.

To meet the needs of users for devices that have newer and more varied functions, attempts are undergoing to develop display devices with new shapes. As one example, various types of interfaces to allow users to select desired information among numerous types of information have been recently proposed.

In view of such developments, a method for providing an interface screen which intuitively provides various types of information and is conveniently manipulated by a user is required.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

In view of the foregoing, there are provided a display apparatus which displays a user interface (UI) screen which allows a user to select desired information from numerous types of information through a simple interaction, and a UI screen providing method thereof.

According to one exemplary embodiment, there is provided a display apparatus which includes a display configured to have a plurality of spaces in a form of a polyhedron, each of the plurality of spaces corresponding to a different category, and configured to display a rotatable Graphic User Interface (GUI), a user interface configured to receive a user interaction for the GUI, and a controller configured to, when one of the plurality of spaces in a form of a polyhedron is selected as the GUI is rotated according to the user interaction, control to display a selected space as a main space, and display at least one content-related information included in a category corresponding to the selected space.

The rotatable GUI may include a path area disposed in a center of the GUI, and a plurality of spaces in a form of a cube which are connected to each other surrounding the path area and spaced apart from each other.

The rotatable GUI may include at least one icon which represents at least one content-related information included in a category corresponding to the plurality of spaces in a form of a polyhedron respectively.

The controller may display a plurality of screens on a first area and the rotatable GUI on a second area according to a predetermined event, and when at least one icon included in the GUI is selected, control to playback a content corresponding to the selected icon on one of the plurality of screens.

The controller may control to display at least one content-related information included in a category corresponding to the selected space as a GUI in a form of a polyhedron.

The controller may control to display a guide GUI which guides an operation state of the GUI according to a predetermined event.

The guide GUI may be an animation UI in which a symbolic shape of the GUI rotates.

The controller may control to display a user authentication screen, and display differently at least one of category information and content-related information included in each category according to user information which is input through the user authentication screen.

The different category may include at least one of a category of watching TV in real time, a category based on video on demand (VOD) content, a category based on sharing of simple notification service (SNS) content, a category of providing an application, and a category of personal content. However, these categories are only exemplary, and other categories may be included.

According to an exemplary embodiment, there is provided a method of providing a UI screen of a display apparatus which includes having a plurality of spaces in a form of a polyhedron corresponding to a different category, and displaying a rotatable GUI, receiving a user interaction for the GUI, and when one of a plurality of spaces in a form of a polyhedron is selected as the GUI is rotated according to the user interaction, displaying a selected space as a main space, and displaying at least one content-related information included in a category corresponding to the selected space.

The rotatable GUI may include a path area disposed in a center of the GUI, and a plurality of spaces in a form of a cube which are connected to each other surrounding the path area and spaced apart from each other.

The rotatable GUI may include at least one icon which represents at least one content-related information included in a category corresponding to the plurality of spaces in a form of a polyhedron respectively.

The method may further include displaying a plurality of screens on a first area and the rotatable GUI on a second area according to a predetermined event, and when at least one icon included in the GUI is selected, playing back a content corresponding to the selected icon on one of the plurality of screens.

The displaying may include displaying at least one content-related information included in a category corresponding to the selected space as a GUI in a form of a polyhedron.

The method may further include displaying a guide GUI which guides an operation state of the GUI according to a predetermined event.

The guide GUI may be an animation UI in which a symbolic shape of the GUI rotates.

The method may further include displaying a user authentication screen, and the displaying may include displaying differently at least one of category information and content-related information included in each category according to user information which is input through the user authentication screen.

The different category may include at least one of a category of watching TV in real time, a category based on VOD content, a category based on sharing of SNS content, a category of providing an application, and a category of personal content. However, these categories are only exemplary, and other categories may be included.

According to various exemplary embodiments, a user can select desired contents from a large quantity of contents merely through a simple interaction, which may result in improvement of user convenience.

BRIEF DESCRIPTION OF THE DRAWING FIGURES

The above and/or other aspects will be more apparent by describing certain exemplary embodiments with reference to the accompanying drawings, in which.

Figure 4A:
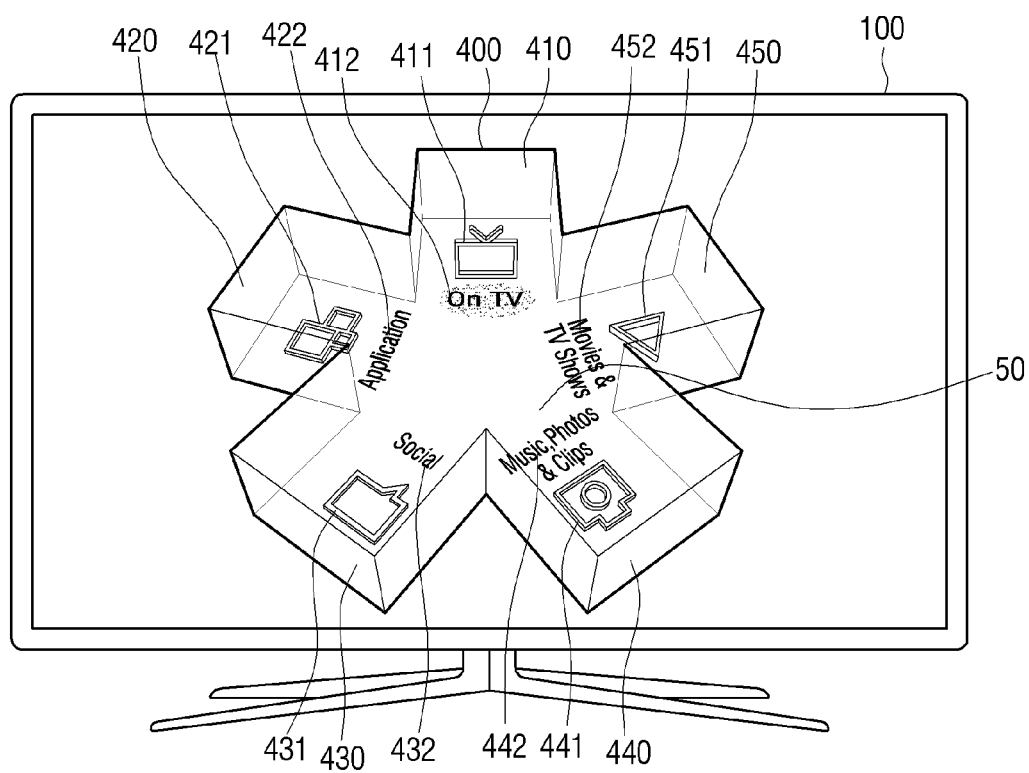
Figure 4B:
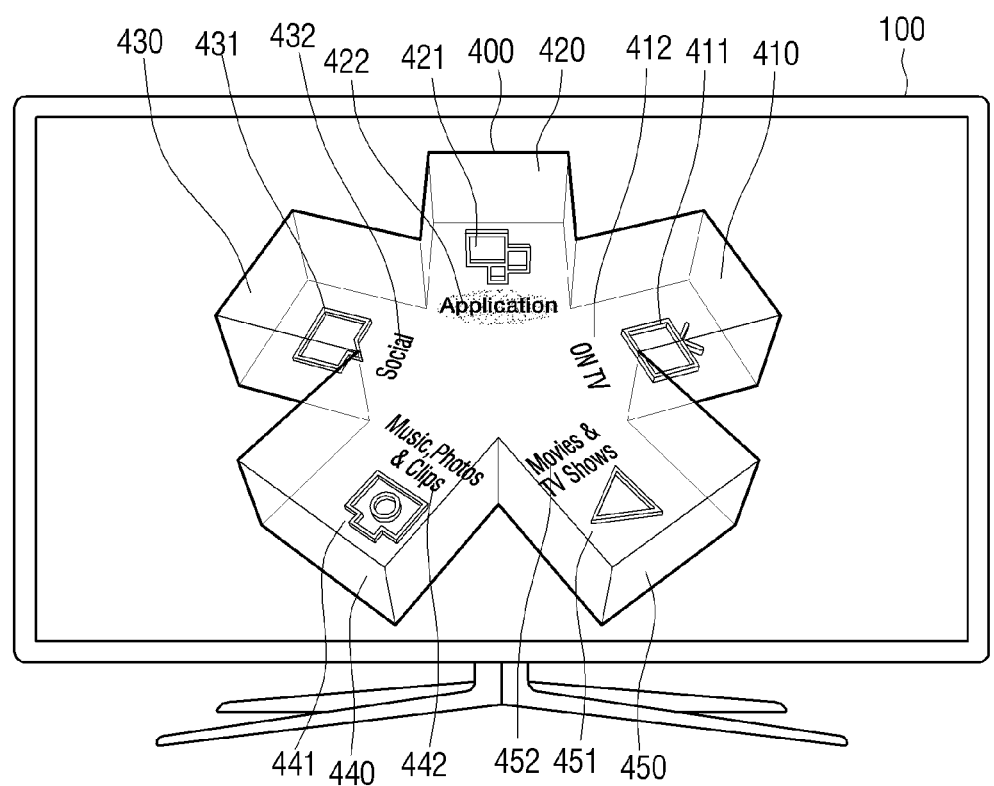
Figure 4C:
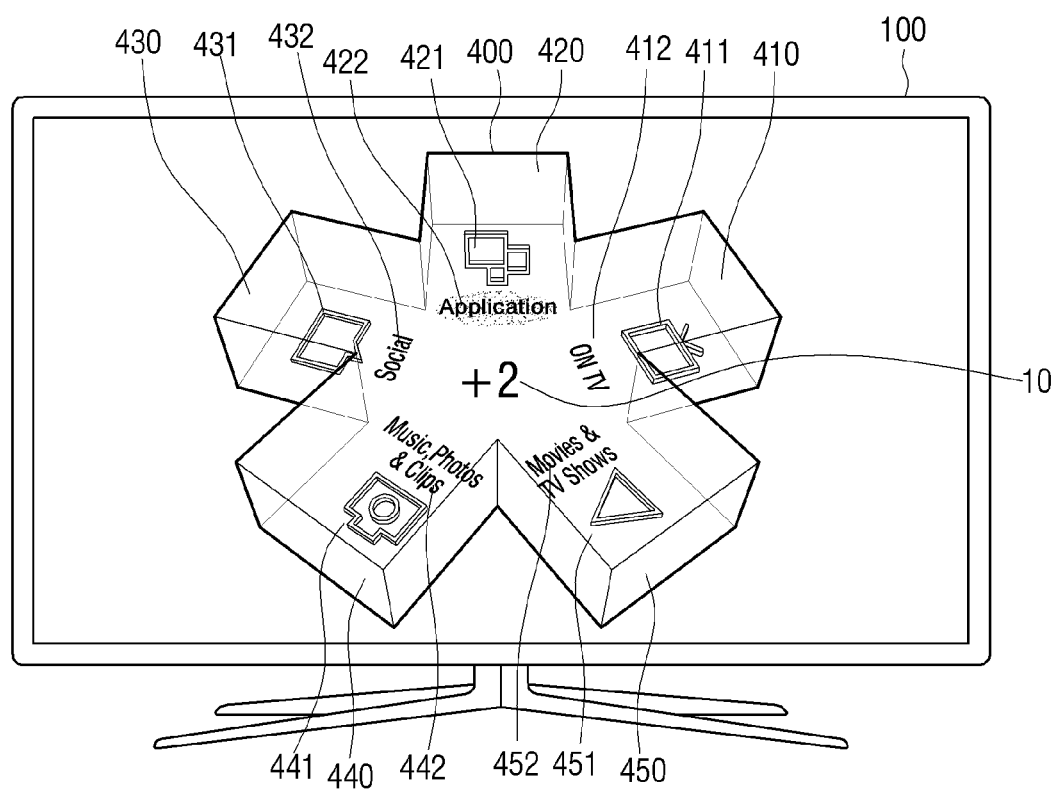
Figure 5A:
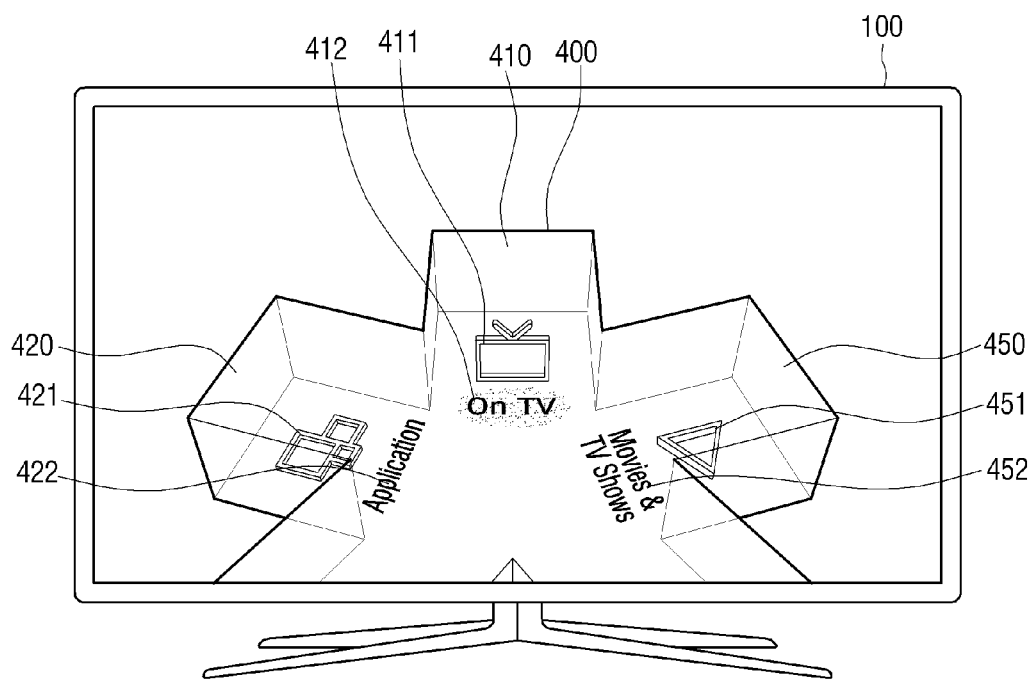
Figure 5B:
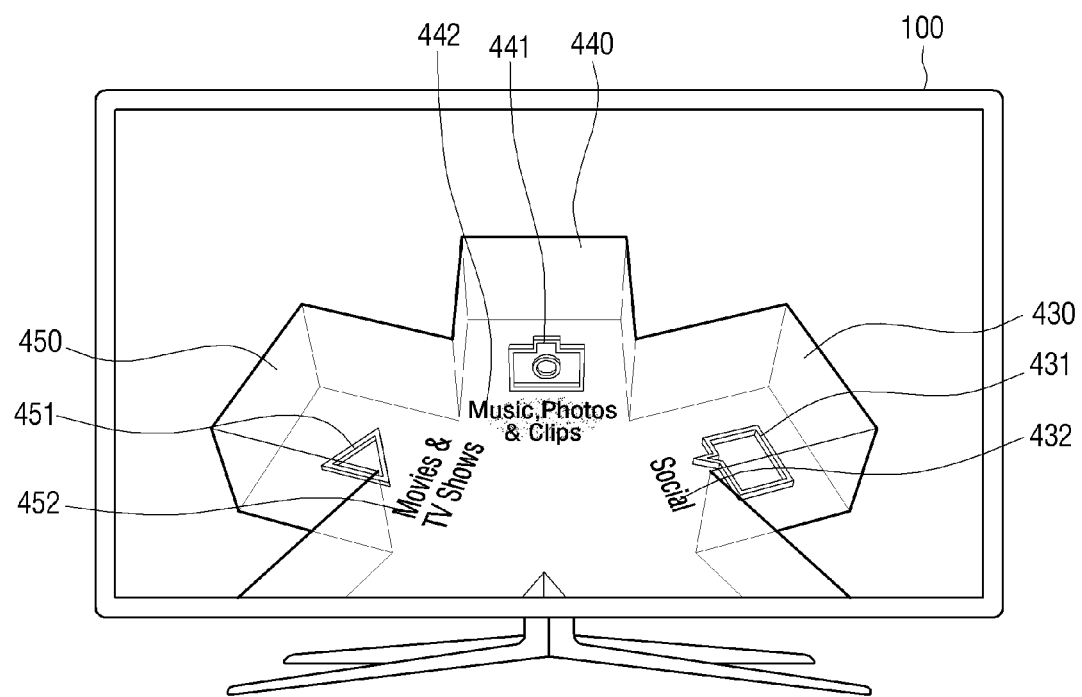
Figure 5C:
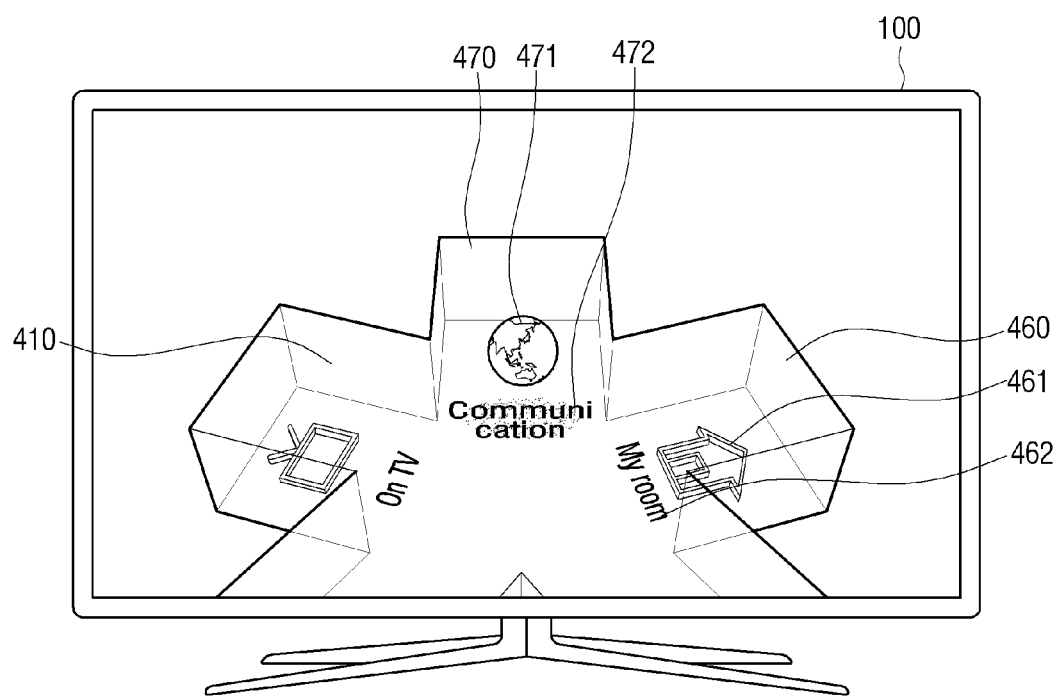
Figure 6A:
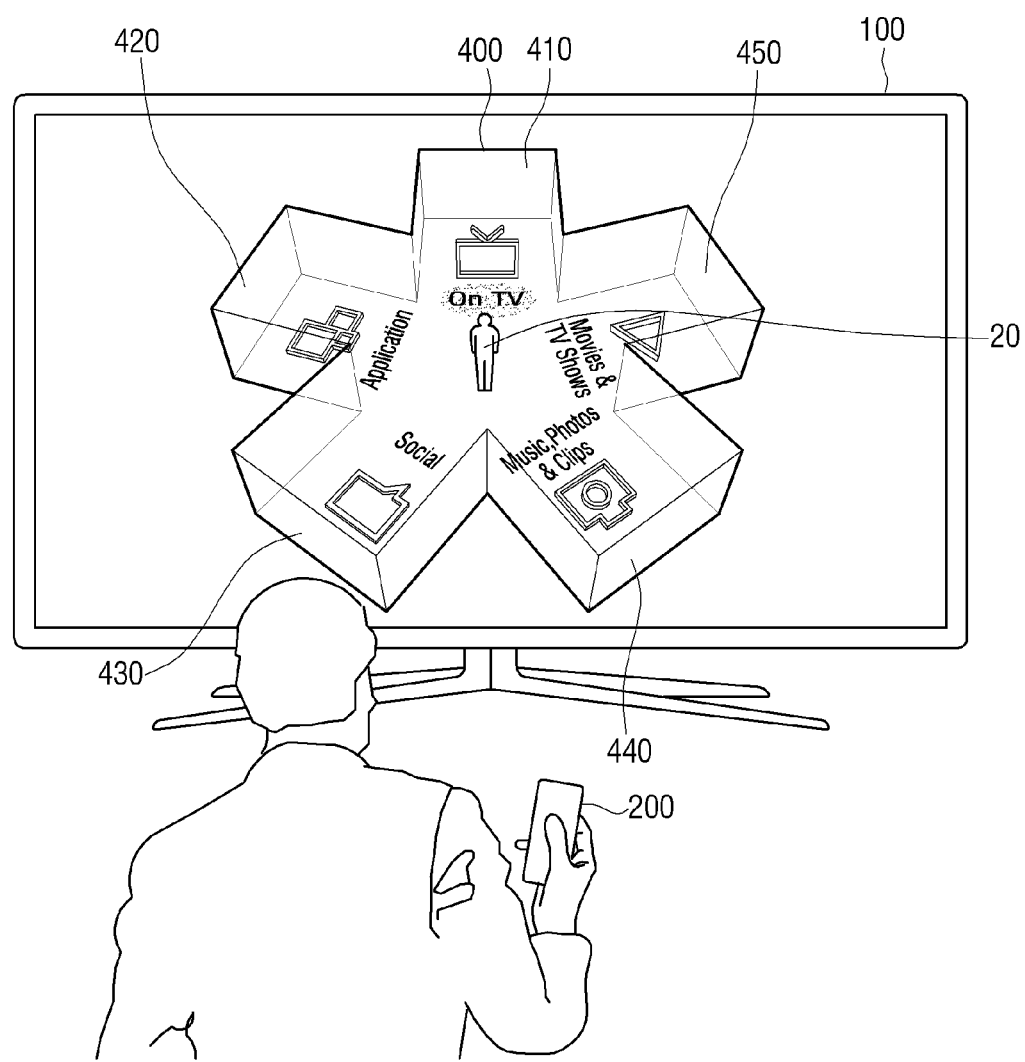
Figure 6B:
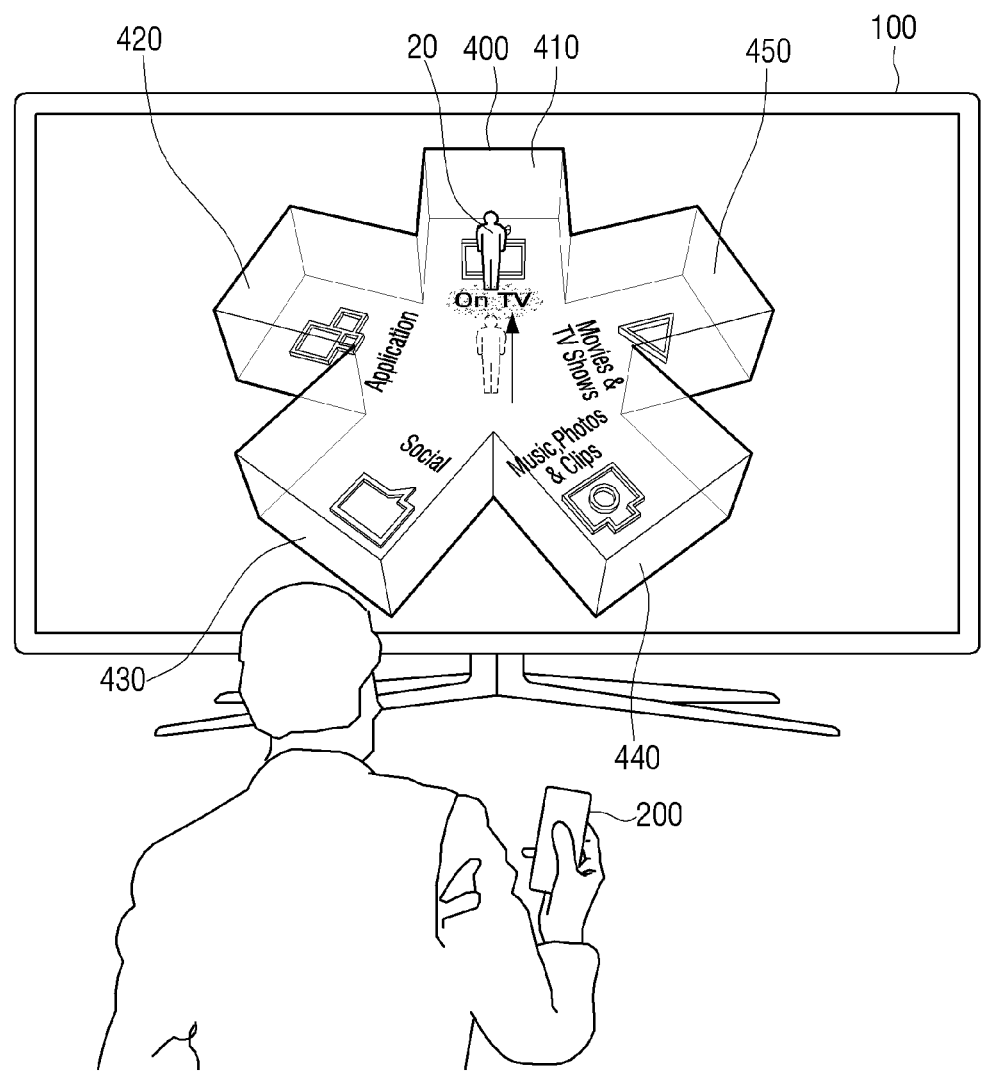
Figure 7A:
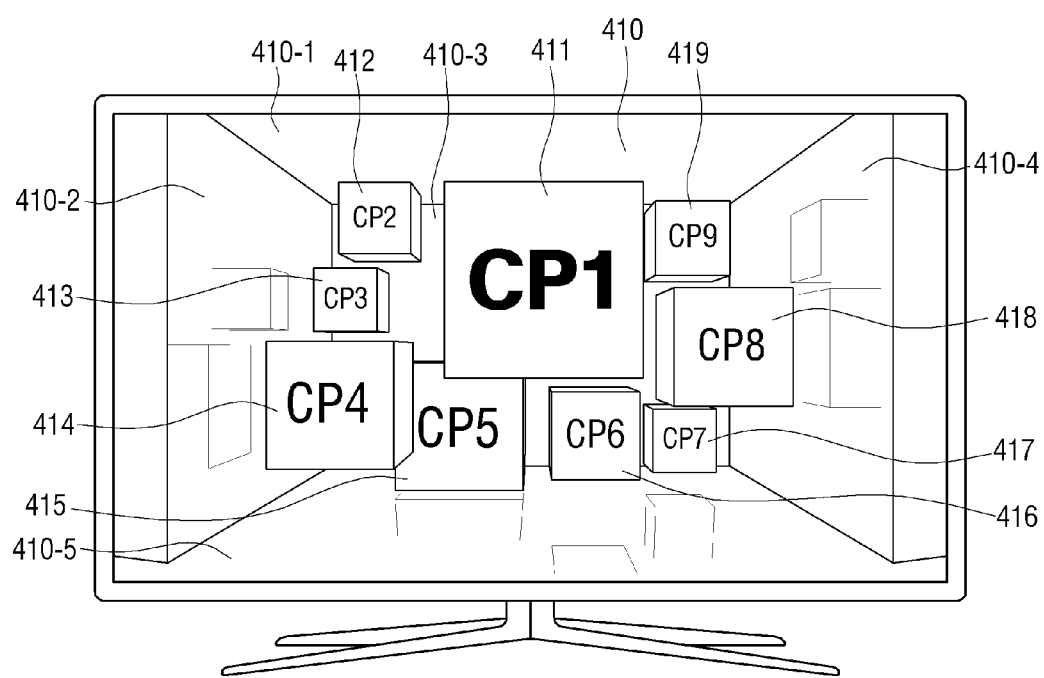
Figure 7B:
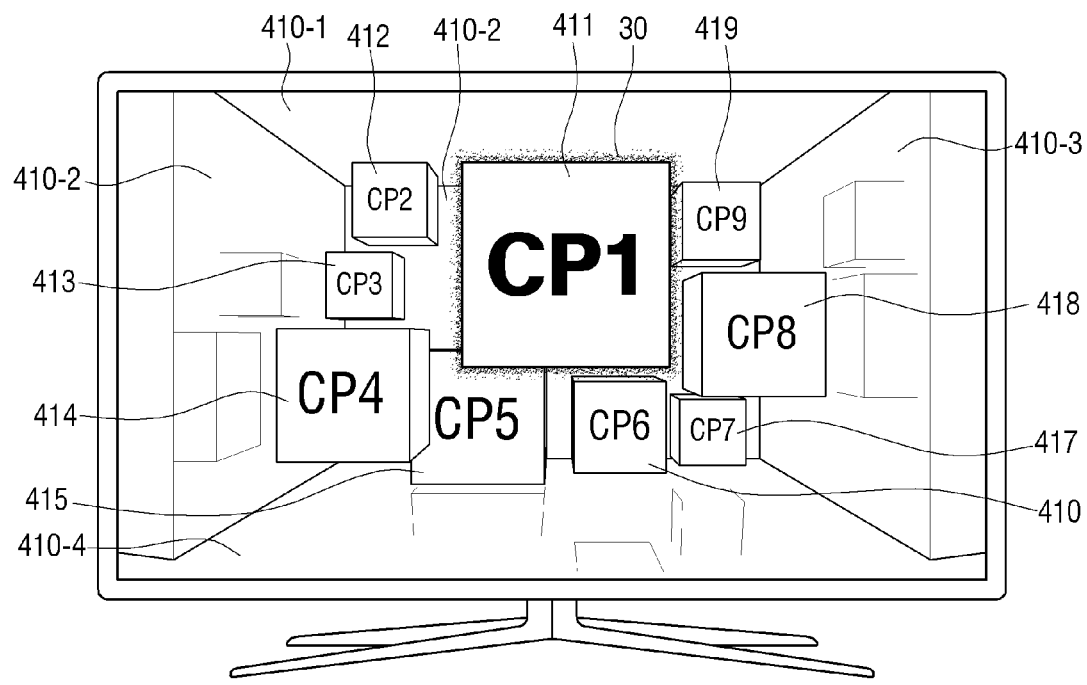
Figure 8A:
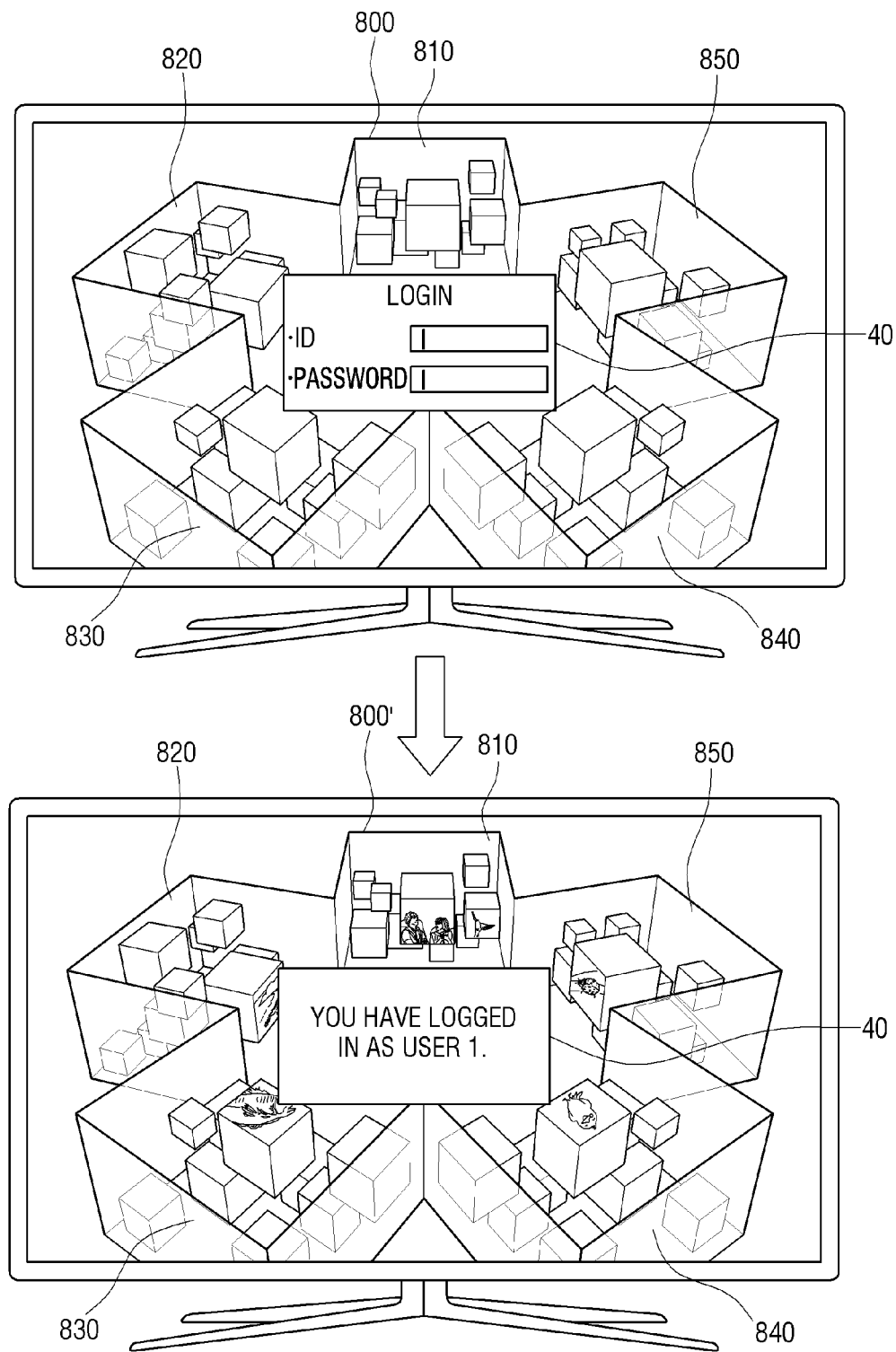
Figure 8B:
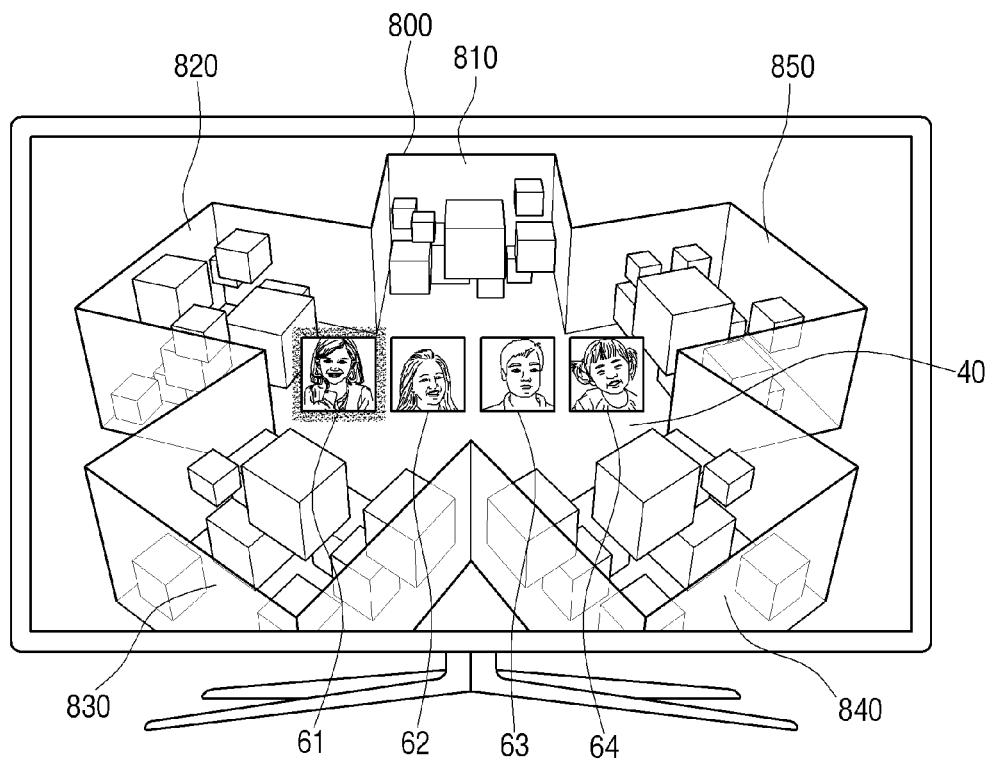
Figure 9A:
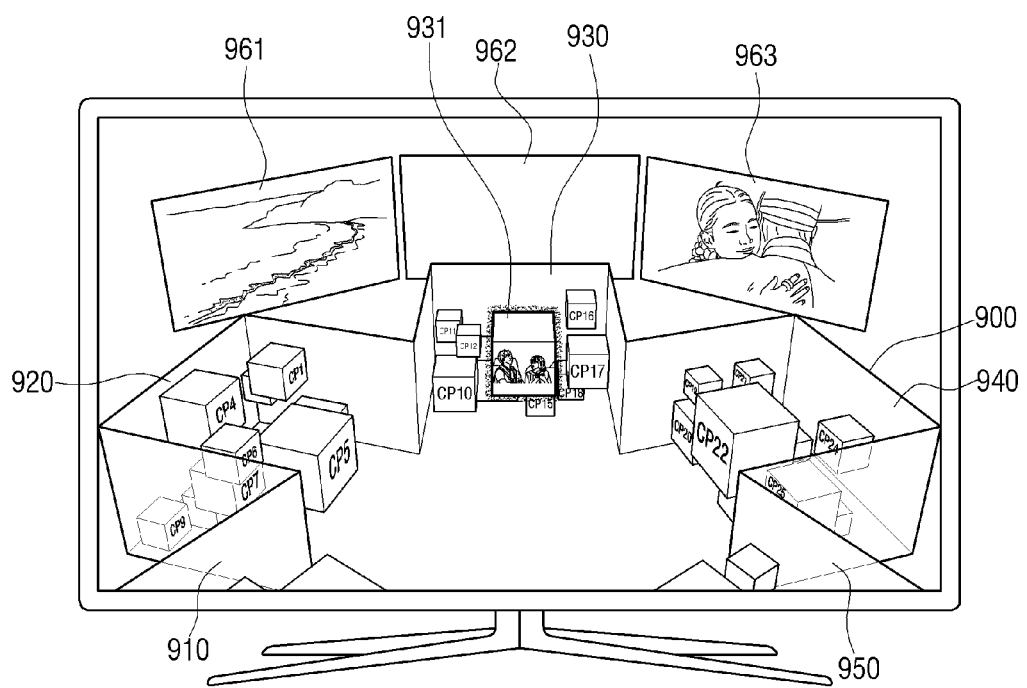
Figure 9B:
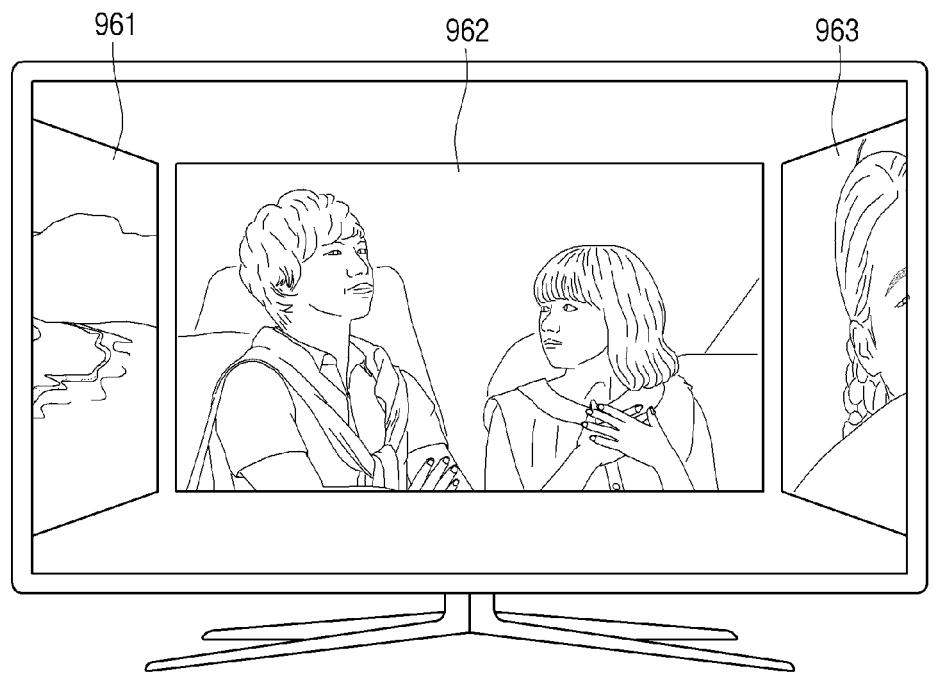
Figure 10:
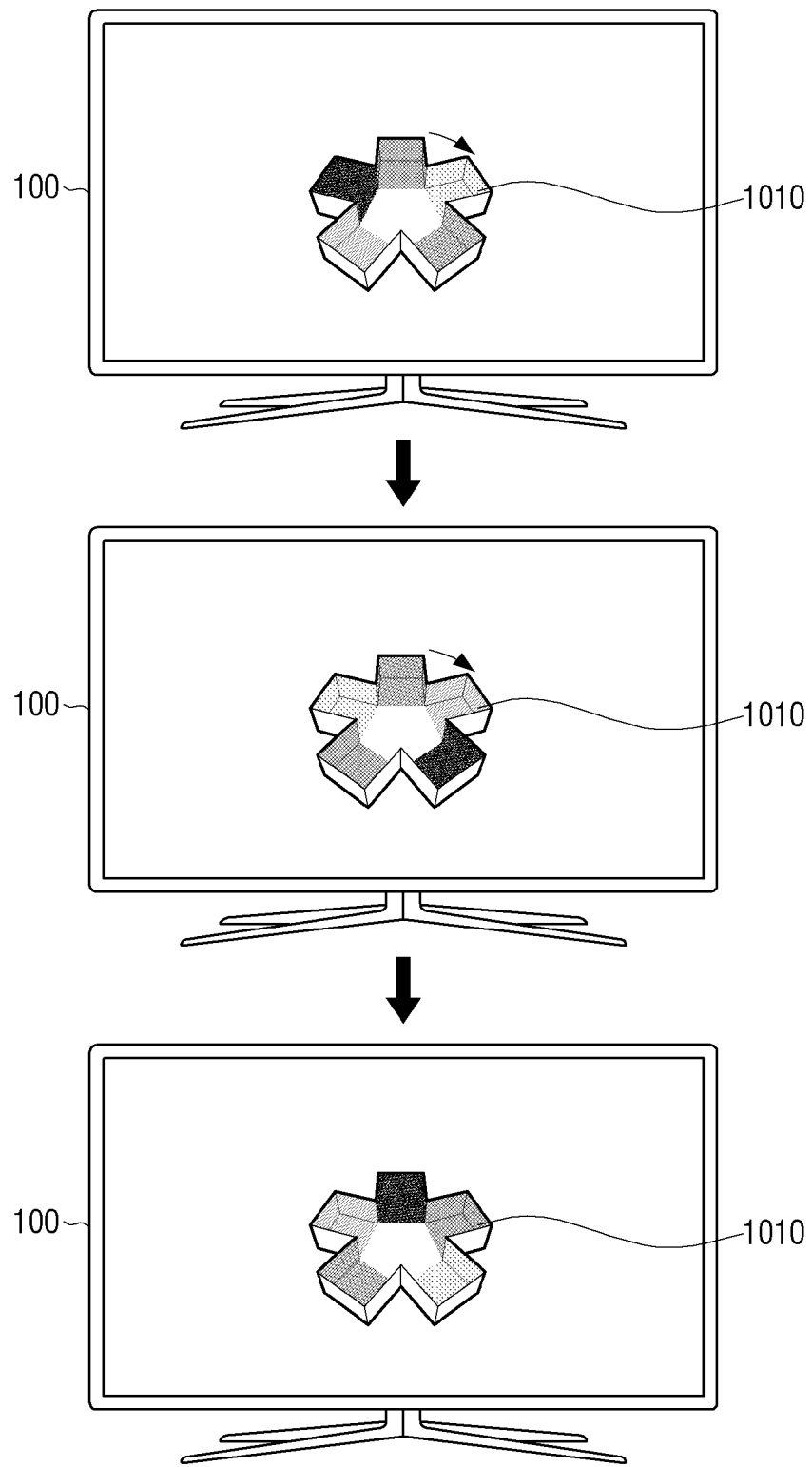

FIGS. 4A, 4B, and 4C are views of a stellar GUI in accordance with an exemplary embodiment;

FIGS. 5A, 5B, and 5C are views of a stellar GUI in accordance with another exemplary embodiment;

FIGS. 6A and 6B are views of a stellar GUI in accordance with another exemplary embodiment;

FIGS. 7A and 7B are views of a UI screen provided when a predetermined room is selected on a UI screen;

FIGS. 8A and 8B are views of a stellar GUI displayed according to user authentication in accordance with another exemplary embodiment;

FIGS. 9A and 9B are views illustrating a method of selecting a content in accordance with another exemplary embodiment;

FIG. 10 is a view of a guide GUI in accordance with another exemplary embodiment;

FIG. 11 is a flowchart illustrating a UI screen providing method in accordance with an exemplary embodiment; and FIG. 12 is a flowchart illustrating a UI screen providing method in accordance with another exemplary embodiment.

DETAILED DESCRIPTION OF THE EXEMPLARY EMBODIMENTS

Hereinafter, description will be given in detail of the present disclosure with reference to the accompanying drawings.

Figure 1:
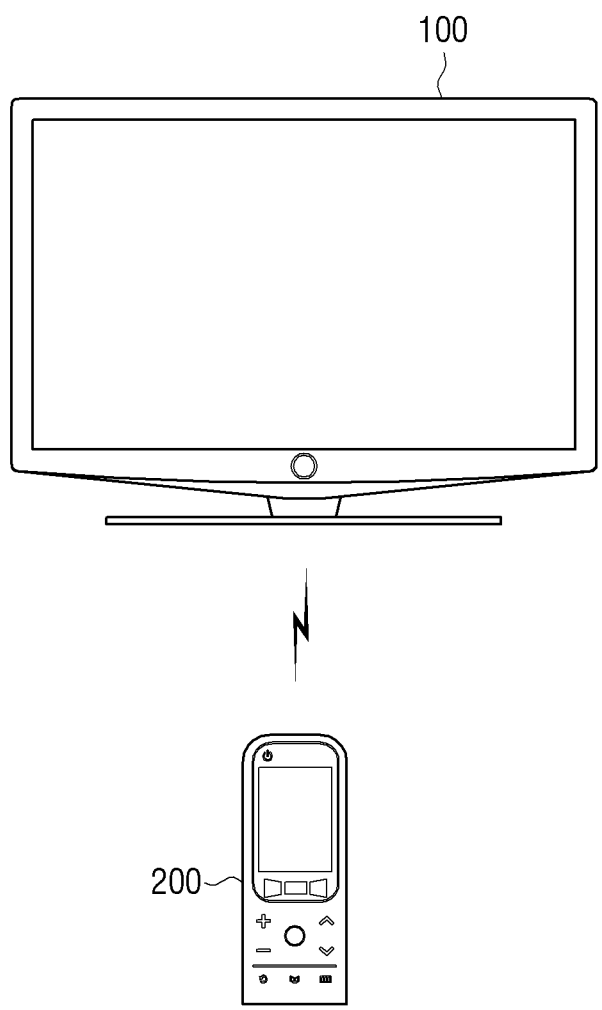
FIG. 1 is a view of a display system in accordance with one exemplary embodiment.

FIG. 1 is a view of a display system in accordance with one exemplary embodiment.

As illustrated in FIG. 1, a display system according to an exemplary embodiment may include a display apparatus 100 and a remote controller 200. The display apparatus 100 may be implemented as, but not limited to, a digital TV as illustrated in FIG. 1. The display apparatus 100 may be implemented as various types of apparatuses having a display function, such as a PC, a mobile phone, a tablet PC, a PMP, a PDA, a navigator and the like. When the display apparatus 100 is implemented as a portable device, it may have a touch screen mounted therein so as to execute a program using a finger or a pen (for example, a stylus pen). Hereinafter, description will be given of an example that the display apparatus is implemented as a digital TV for the sake of explanation.

When the display apparatus 100 is a digital TV, the display apparatus may be controlled by a user's motion or the remote controller 200. The remote controller 200 is a device for remotely controlling the display apparatus 100. The remote controller 200 may receive a user's command and transmit a control signal corresponding to the received user command to the display apparatus 100. For example, the remote controller 200 may be implemented into various forms, such as sensing movement of the remote controller 200 and transmitting a signal corresponding to the movement, recognizing a user's voice and transmitting a signal corresponding to the recognized user's voice, or transmitting a signal corresponding to an inputted key. The remote controller 200 may receive various types of user commands from a motion sensor, a touch sensor, an optical joystick (OJ) employing an optical technology, a physical button (for example, tack switch), a display screen, a microphone and the like. The OJ sensor is an image sensor for sensing a user manipulation through the OJ, and may execute an operation such as an optical mouse being turned over. That is, when a user touches the OJ with a finger, the OJ sensor may analyze an optical signal.

The display apparatus 100 may provide various shapes of three-dimensional (3D) user interface (UI) screens according to a user's command input through the remote controller 200.

Specifically, the display apparatus 100 may have a plurality of spaces corresponding to different categories, respectively, and provide a UI screen displaying a rotatable GUI. Hereinafter, description will be given of various exemplary embodiments with reference to a block diagram, which illustrates a detailed configuration of the display apparatus 100.

Figure 2A:
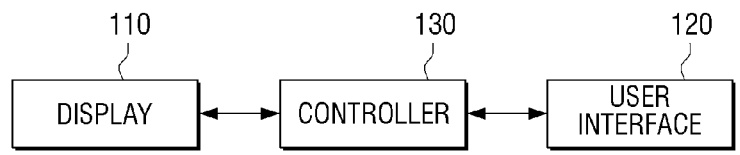
FIGS. 2A and 2B are block diagrams of a configuration of a display apparatus in accordance with an exemplary embodiment.

FIG. 2A is a block diagram of a configuration of a display apparatus in accordance with an exemplary embodiment.

As illustrated in FIG. 2A, the display apparatus 100 may include a display 110, a user interface 120 and a controller 130.

The display 110 may output a screen. The screen may include a screen for reproducing (playing back) various types of contents, such as image, video, text, music and the like, a screen for executing an application including various contents, a web browser screen, a graphic user interface (GUI) screen and the like.

The display 110 may be implemented as, but not limited to, a liquid crystal display panel (LCD), an organic light emitting diodes (OLED) and the like. Also, the display 110 may also be implemented as a flexible display, a transparent display and the like in some cases.

<Form and Structure of Stellar GUI>

Specifically, the display 110 may have a plurality of spaces corresponding to different categories, respectively, and may output a rotatable graphic user interface (GUI). Specifically, the rotatable GUI may include a path area located in a center of the GUI, and a plurality of spaces in a form of a cube, connected to one another via the path area and spaced from one another. That is, the rotatable GUI may have a structure similar to a shape of star. Hereinafter, the GUI will be referred to as a stellar GUI for the sake of explanation.

In accordance with an exemplary embodiment, the display 110 may also display identification information for identifying categories corresponding to the plurality of spaces, respectively, which construct the stellar GUI. For example, the display 110 may display the identification information in a form of at least one of an icon and a text representing category information.

Also, in accordance with another exemplary embodiment, the display 110 may output content-related information belonging to the respective categories corresponding to the plurality of spaces, which construct the stellar GUI, in a form of an icon. For example, polyhedral icons belonging to the respective categories may be displayed in a form of floating on space with spaced distances from one another. Here, the content-related information may include at least one of a multimedia content, a contents provider and a service provider.

The categories corresponding to the respective spaces may be classified into various types, for example, into a category of real-time TV shows, a VOD contents-based category, a category based on sharing of SNS contents, a category of providing applications, a personal contents-related category and the like. This is merely illustrative, and such categories may be classified based on various standards.

Also, the provided categories may not be limited to the number of spaces, and may be provided infinitely according to rotation of the stellar GUI.

<Stellar GUI and Multi-Screen>

The display 110 may output a plurality of screens on a first area of the display 110 and a stellar GUI on a second area according to a preset event. The stellar GUI may be displayed in a form that an icon belonging to a category corresponding to each space is included in the space. This is a screen for reproducing (playing back) a content corresponding to an icon selected from the stellar GUI on a plurality of screens, which will be explained in detail later.

<Form and Structure of Each Space Constructing Stellar GUI>

Each of the plurality of spaces constructing the stellar GUI may include spatial elements of a ceiling, walls and a floor. That is, each space may include three walls for supporting a ceiling space, and a floor space located at a lower side of the three walls, similar to a room. An area facing a middle wall of the three walls may be an area which is connected to the path area. According to an exemplary embodiment, when a predetermined space is selected as a main space and displayed in an enlarged state, a point of view that a user sees the room at a location of one wall non-displayed, namely, a location connected to the path area may be provided.

Each spatial element, which constructs each space included in the stellar GUI, may provide a different type of UI screen, namely, a UI screen providing a different service (or function) or a different type of information. In detail, according to an exemplary embodiment, an information service may be provided on the ceiling space, a commerce service may be provided on the wall space and a control service may be provided on the floor space.

On the room space defined by the three walls, content-related information, which belongs to a corresponding category, may be provided in the form of icon. The icon may be a GUI in a form of a polyhedron. The polyhedron may be a cubic hexahedron, and in this case, the corresponding GUI may be referred to as a cubic GUI. However, this is merely illustrative. The polyhedral GUI may have a stereoscopic shape, such as a triangular prism, a hexagonal prism, a rectangular parallelepiped, a sphere and the like, and may also have a shape of a planar figure, such as a square, a circle, a triangle and the like.

Hereinafter, description will be given of an example that the polyhedral GUI is a cubic GUI for the sake of explanation.

<Cubic GUI>

A cubic GUI displayed on the room space is a display element in a form of a hexahedron. The cubic GUI may be implemented to represent predetermined content-related information. For example, the cubic GUI may indicate content, a contents provider, a service provider and the like.

Also, at least one of the surfaces defining the cubic GUI may function as an information surface for providing predetermined information to a user. For example, at least one of the surfaces of the cubic GUI may display various types of information, such as contents provider information, content information, service provider information, service information, application execution information, contents execution information, user information and the like. Also, the displayed information may include various elements, such as text, file, image, video, icon, button, menu, stereoscopic icon and the like. For example, the contents provider information may be provided in a form of icon, logo or the like, which indicates the contents provider. The content information may be provided in a form of a thumbnail. Also, the user information may be provided as a profile image of each user. For the thumbnail, additional information provided from an original content may be decoded to be converted into a size of thumbnail. When such additional information is not present, the original content may be decoded and converted into a size of thumbnail so as to be extracted as a thumbnail image in a reduced form. The original content may be a still image or a video. When the original content is a video, a thumbnail image in a form of an animation image having a plurality of still images may be generated.

A pointing GUI may be displayed on one of a plurality of cubic GUIs to navigate the plurality of cubic GUIs. For example, the plurality of cubic GUIs may have priorities, which are set according to at least one of a user motion pattern and a content attribute. The pointing GUI may be displayed by being disposed on a cubic GUI having the highest priority.

<Displayed Form of Cubic GUI on Space>

The cubic GUI may be displayed in a form of floating on a room space.

Specifically, when one of a plurality of spaces, which construct at least one stellar GUI, is selected as a main space according to a user interaction, the display 110 may display a cubic GUI in a form of floating on a 3D space defined by three walls arranged along an X axis of the display 110 and having a predetermined depth on a Z axis. In detail, the display 110 may output a UI screen in a form that a plurality of cubic GUIs are floating on a room space which has a first wall defined by a left surface, a second wall defined by a rear surface, and a third wall defined by a right surface. A ceiling space may be displayed above the three walls, and a floor space may be displayed below the three walls. In a default state where the room space is displayed as a main space, the ceiling space and the floor space may be partially displayed.

The plurality of cubic GUIs may be displayed in a matrix form with an n*m arrangement by predetermined intervals within the room space. However, the display of the GUIs is not limited thereto. The plurality of cubic GUIs may also be arranged in various forms, such as a radial form, a linear form and the like. Also, the cubic GUIs may be provided in a two-dimensional (2D) or 3D manner. The 2D manner may display the cubic GUI on a screen in a form that one surface is displayed and the other surfaces are hidden. The 3D manner may display the cubic GUI on the screen in a form that at least two surfaces are stereoscopically displayed.

<Displaying of Guide GUI>

Also, the display 110 may display a guide GUI for guiding an operation state of the stellar GUI prior to displaying the stellar GUI according to a preset event. Here, the guide GUI may be an animation image that a symbolic shape of the stellar GUI is rotating. Also, the preset event may be generated when a user interaction for driving the stellar GUI is input. However, the preset event is not limited thereto. For example, the guide GUI may be displayed when a user interaction is not received for more than a preset time after the stellar GUI has been driven, namely, when a waiting time is continued for more than a preset time.

The form of the guide GUI may not be limited to this and an animation image representing various exemplary embodiments may be provided as the guide GUI. For example, another exemplary embodiment in which a stellar GUI symbol and a plurality of screens on an outer side of the symbol are displayed and selected contents are reproduced (played back) on the plurality of screens may also be provided as a form of the guide GUI.

The guide GUI may also guide a range of information or services provided by the stellar GUI as well as operations according to various exemplary embodiments.

<Screen-Displayed State>

The stellar GUI and various relevant UI screens may be provided in a form of 2D or 3D screens. That is, the display 110 may implement a 3D screen by way of time-dividing a left-eye image and a right-eye image and displaying the time-divided images in an alternating manner. Here, a depth may be realized by disparity between the left-eye image and the right-eye image. Accordingly, the user can acquire depth information related to various objects included in the UI screen to create a stereoscopic effect. Here, for a 2D image, a 3D space may be realized by depth perception processing with respect to objects within the UI screen.

The user interface 120 may receive various user interactions. Here, the user interface 120 may be implemented in various forms according to the implementation of the display apparatus 100. When the display apparatus 100 is implemented as a digital TV, the user interface 120 may be implemented as a remote control receiver for receiving a remote control signal from the remote controller 200, a camera for sensing a user motion, a microphone for receiving a user's voice and the like. The user interface 120 may also be implemented as a touch screen having an inter-layered structure with a touch pad. In this structure, the user interface 120 may be used as the display 110.

<User Interaction for 3D Space>

The user interface 120 may receive various user interactions with respect to UI screens in accordance with various exemplary embodiments.

Specifically, the user interface 120 may receive various user interactions, such as a user interaction for controlling a stellar GUI, a user interaction for rotating a stellar GUI, a user interaction for displaying one of a plurality of spaces, constructing a stellar GUI, as a main space, a user interaction for selecting at least one cubic GUI, selected from a selected space or a stellar GUI, to playback on a multi-screen, and the like.

Specifically, the user interface 120 may receive various types of user interactions for rotating the stellar GUI.

i) User interaction in response to a user's motion.

The user interaction may be input by a user's motion.

For example, the stellar GUI may be rotated in a clockwise or counterclockwise direction by a spiral rotation motion that a palm in an unfolded state rotates like drawing a circle greater than a preset size in a right-hand or left-hand direction.

Also, the stellar GUI may be rotated in a clockwise or counterclockwise direction by a motion of rotating a user's head to a right-hand or left-hand side and a motion of inclining the user's head to a right-hand or left-hand side.

Accordingly, the user interface 120 may include a camera for capturing the user's motion.

The exemplary embodiment may not be limited to this. For example, the user's motion may be realized into various forms, such as a motion of rotating an eye to a right-hand or left-hand side.

ii) User interaction in response to the motion of the remote controller.

The user interaction may also be input by a motion of the remote controller 200.

For example, the stellar GUI may be rotated in a clockwise or counterclockwise direction in response to a motion of moving the remote controller 200 to a right-hand or left-hand side. Accordingly, the remote controller 200 may include at least one of a geomagnetic sensor (for example, a 9-axis geomagnetic sensor) for sensing a motion, an acceleration sensor and a gyro sensor.

The remote controller 200 may be implemented such that an OJ sensor disposed therein executes a trigger function. That is, when an interaction of pressing the OJ sensor for more than a preset time is input, the display apparatus 100 may determine the corresponding input as a trigger command that starts determining movement of the remote controller 200, and output an indicator guiding the movement of the remote controller 200 on a screen of the display apparatus 100. This will be described in detail later with reference to the accompanying drawings. For an interaction of pressing the OJ sensor for a time period which is shorter than a preset time, the OJ sensor may be implemented to carry out an enter function, for example, a function of selecting a specific cubic GUI in a state that the corresponding cubic GUI has been pointed and playing back the function associated with the selected cubic GUI on a screen.

The present disclosure may not be limited to this. A gesture motion of the remote controller may also be input as the user interaction. For example, a predetermined gesture (a gesture of drawing a circle in a clockwise or counterclockwise direction) may be input as a gesture for displaying a ceiling or floor space.

iii) User interaction in response to sensing of OJ sensor of remote controller.

The user interaction may also be input by manipulation on the OJ sensor of the remote controller 200.

For example, the stellar GUI may be rotated in a clockwise or counterclockwise direction, in response to manipulation in right-hand or left-hand direction on the OJ sensor of the remote controller 200. The OJ sensor is an image sensor for sensing a user manipulation through the OJ, and operates like an optical mouse being turned over. That is, when a user touches the OJ with a finger, the OJ sensor may analyze an optical signal.

iv) User interaction in response to button input of remote controller.

The user interaction may also be input in response to manipulation of the buttons of the remote controller 200.

Specifically, the stellar GUI may be rotated in a clockwise or counterclockwise direction, in response to pressing a first or second button of the remote controller 200. For example, the first button may be a button "→" and the second button may be a button "←."

v) User interaction in response to manipulation on the touch panel of remote controller.

The user interaction may also be input by manipulation on a touch panel disposed on the remote controller 200.

For example, the stellar GUI may be rotated in a clockwise or counterclockwise direction, in response to dragging in a right-hand or left-hand direction on the touch panel of the remote controller 200. On the other hand, the stellar GUI may be rotated in a clockwise or counterclockwise direction, in response to a dragging motion, to draw a circle in the clockwise or counterclockwise direction. The touch panel may have a pressure-sensitive or electrostatic touch sensor, to detect (sense) coordinates on a user-touched portion. However, the exemplary embodiment may not be limited to this. A text, such as right, R (Right), left and L (left) for identifying a corresponding space or a symbol, such as "→" or "←,", may also be input on the touch panel.

vi) User interaction in response to voice recognition.

The user interaction may also be input in response to voice recognition through a microphone disposed in the remote controller 200 or a separately disposed microphone.

For example, the stellar GUI may be rotated in a clockwise or counterclockwise direction, in response to a user's voice like "to right" or "to left." Here, such voice commands are not be limited to this. For example, the voice command may have various forms such as "clockwise" or "counterclockwise."

The user interface 120 may sense a user interaction with respect to a cubic GUI, which is displayed as a floating cubic room defined by three walls when the wall space is displayed as a main space.

For example, the user interface 120 may sense various user interactions, such as a user interaction for selecting a cubic GUI, a user interaction for rotating a cubic GUI, a user interaction for changing a displaying degree of a cubic GUI, a user interaction for slicing a cubic GUI, a user interaction for changing the size, location and depth of a cubic GUI, a user interaction for scrolling one surface of a cubic GUI, a user interaction for rubbing one surface of a cubic GUI, a user interaction for displaying a single cubic GUI, a user interaction for a group of cubic GUIs, and the like.

Additionally, the user interface 120 may receive a user interaction for displaying a ceiling space or a floor space as a main space while a wall space is displayed as the secondary space.

The controller 130 may control the general operations of the display apparatus 100.

<Displaying of Main Screen in Response to User Interaction>

In detail, when one of a plurality of spaces is selected as a stellar GUI, and is rotated in response to a user interaction received through the user interface 120, the controller 130 may control the selected space to be displayed as a main space. The displaying of the selected space as the main space may indicate that the corresponding space occupies more than a preset rate of an entire screen.

When a selected space is displayed as a main space, the controller 130 may control at least one content belonging to a corresponding category to be displayed in a form of icon. Here, the stellar GUI may include a path area located in a center of the GUI, and a plurality of spaces in a form of a cube, are connected to one another via the path area and spaced from one another while surrounding the path area. Accordingly, when a predetermined space is selected, a visual effect, like a user entering the selected space from the path area, may be provided and the selected space may be displayed in an enlarged state. Also, an icon may have the form of the cubic GUI.

<Stellar GUI Corresponding to Each User>

The controller 130 may provide an authentication screen for user authentication. Specifically, a UI for inputting a user's ID and password may be provided.

Then, when the user authentication is executed, the controller 130 may display a stellar GUI 800' (FIG. 8A) corresponding to the authenticated user. Accordingly, a stellar GUI corresponding to each user may be provided according to the user authentication. This may allow the user to configure the stellar GUI in a desired shape.

The foregoing exemplary embodiments are merely illustrative. The controller 130 may provide a stellar GUI corresponding to each user only based on identification information, without the user authentication. For example, the controller 130 may provide a plurality of user identification information (for example, identification icons) corresponding to a plurality of users, respectively. When a predetermined icon is selected, a stellar GUI corresponding to the selected icon may be provided.

Consequently, a stellar GUI which reflects motion patterns, preference and the like of each user may be provided.

<Stellar GUI and Multiscreen>

The controller 130 may display a plurality of screens on a first area and a stellar GUI on a second area according to a preset event (FIG. 9A). When at least one icon included in the stellar GUI is selected, the controller 130 may control a content corresponding to the selected icon to be played backed (reproduced) on one of the plurality of displayed screens. That is, when a preset event is generated while the stellar GUI is displayed on the screen, the controller 130 may shift the stellar GUI to one area of the screen and display the plurality of screens on another area. The one area may be a lower area of the screen and the another area may be an upper area of the screen. However, this arrangement of the one area and the another area is only exemplary.

In this case, when a preset user interaction is sensed by the user interface 120 after one of the plurality of icons included in the stellar GUI has been selected, the controller 130 may control a content corresponding to the icon selected according to the preset user interaction to be played back on one of the plurality of screens. In detail, when a pre set user interaction is sensed by the user interface 120 while a pointing GUI is displayed on one of the plurality of icons included in the stellar GUI, the controller 130 may control the display 110 to playback a content corresponding to a highlighted icon on one screen of the plurality of screens, corresponding to the preset user interaction.

In accordance with an exemplary embodiment, when a preset user interaction is a user interaction which selects one of a plurality of buttons corresponding to the plurality of screens, respectively, arranged on the remote controller, namely, when a user interaction selecting one of the plurality of buttons is input while one of a plurality of cubic GUIs is pointed, then the controller 130 may control a content corresponding to the pointed cubic GUI to be reproduced on a screen, corresponding to the selected button, of the plurality of screens.

The aforementioned exemplary embodiment has illustrated use of a preset button disposed on the remote controller in order to select a screen for displaying a content corresponding to a selected cubic GUI. However, this exemplary embodiment is merely illustrative, and a screen for displaying content may also be selected by other methods. For example, a user may select a screen for displaying content corresponding to a cubic GUI by using a voice command. In detail, when a user's voice outputs the utterances "one" or "first" while a first cubic GUI, which corresponds to a first broadcast channel, of a plurality of cubic GUIs is pointed to, the controller 130 may control a broadcasting content of the first broadcast channel corresponding to the first cubic GUI to be displayed on a main screen. As another example, the user may select a screen for displaying content corresponding to a cubic GUI selected using a user's hand motion. In detail, when a first motion (for example, a grabbing motion) is input by the user and then a second motion (for example, a moving motion) of moving a second cubic GUI up to an area where a second sub screen is located is input while a third cubic GUI corresponding to a first SNS content is pointed among the plurality of cubic GUIs, the controller 130 may control the first SNS content corresponding to the third cubic GUI to be displayed on the second sub screen.

The displaying of the main space may be a form that the corresponding space occupies more than a preset rate of an entire screen. In some cases, the main space may include even a form that a user interaction is sensed as an interaction for the corresponding space may also be included. That is, if information is simply displayed on a main space, the main space may be displayed in the form of occupying more than the preset rate of the entire screen. However, the displaying of the main space may be the form that the user interaction is sensed as the interaction for the main space only when the corresponding main space is required to be controlled according to the user interaction. In the meantime, user interactions for displaying the ceiling space or the floor space as the main space may include a head up/down motion, upward/downward moving motion of a remote control and the like.

<Guide GUI>

The controller 130 may also display a guide GUI guiding an operation state of a stellar GUI according to a preset event. That is, when a user interaction for operating the stellar GUI is input, the controller 130 may display a guide GUI for guiding the operation of the stellar GUI in a form of a stellar symbol. For example, an animation image that a symbol having the form of the stellar GUI is rotating may be displayed to guide a method of using the stellar GUI for the user. Here, as aforementioned, various forms of guide GUIs may be provided according to various exemplary embodiments.

Figure 2B:
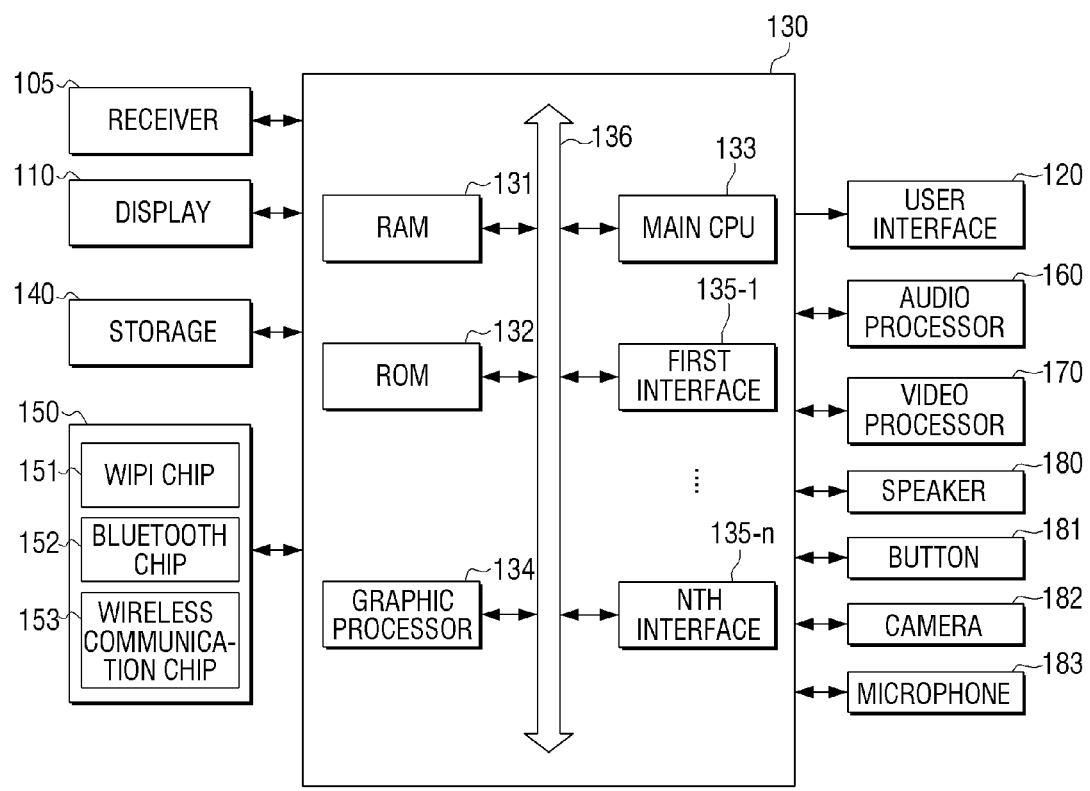

FIG. 2B is a block diagram of a detailed configuration of the display apparatus 100 in accordance with another exemplary embodiment. Referring to FIG. 2B, the display apparatus 100 may include an image receiver 105, a display 110, a user interface 120, a controller 130, a storage 140, a communication unit 150, an audio processor, a video processor, a speaker 180, a button 181, a camera 182, a microphone 183 and the like. Detailed description of several components illustrated in FIG. 2A, which have already been described in FIG. 1, will be omitted.

The image receiver 105 may receive image data through various sources. For example, the image receiver 105 may receive broadcast data from an external broadcasting station, image data from an external device (for example, a DVD, a BD player, etc.), or image data stored in the storage 140. Specifically, the image receiver 105 may include a plurality of image receiving modules which receive a plurality of images for displaying a plurality of contents selected by a cubic GUI on a plurality of screens, respectively. For example, the image receiver 105 may include a plurality of tuners for simultaneously displaying a plurality of broadcast channels.

The controller 130 may execute control of overall operations of the display apparatus 100 using various programs stored in the storage unit 140.

In detail, the controller 130 may include a RAM 131, a ROM 132, a main CPU 133, a graphic processor 134, first to $n^{th}$ interfaces 135-1 to 135-n, and a bus 136.

The RAM 131, the ROM 132, the main CPU 133, the graphic processor 134 and the first to $n^{th}$ interfaces 135-1 to 135-n may be connected together via the bus 136.

The first to $n^{th}$ interfaces 135-1 to 135-n may be connected to the aforementioned various components. One of the interfaces may be a network interface which is connected to an external device via a network.

The main CPU 133 may access the storage 140 to execute booting using an operating system (O/S) stored in the storage 140. The main CPU 133 may also execute different operations using various programs, contents, data and the like stored in the storage 140.

The ROM 132 may store sets of command words for system booting. When power is supplied in response to an input of a turn-on command, the main CPU 133 may copy the O/S stored in the storage 140 into the RAM 131 according to a command word stored in the ROM 132, execute the O/S and boot the system. Upon completion of the booting, the main CPU 133 may copy various application programs stored in the storage 140 into the RAM 131, activate the copied application programs, and execute various operations.

The graphic processor 134 may generate a screen including various objects, such as an icon, an image, text and the like, using a calculating element (not shown) and a rendering element (not shown). The calculating element (not shown) may calculate attribute values, such as coordinate values, shape, size, color and the like for displaying each object according to a screen layout based on a received control command. The rendering element (not shown) may generate a screen with various layouts including the objects based on the calculated attribute values. The screen generated by the rendering element (not shown) may then be displayed within a display area of the display 110.

The aforementioned operations of the controller 130 may be carried out by the programs stored in the storage 140.

The storage 140 may store an O/S software module for driving the display apparatus 100, various multimedia contents, various applications, and various data such as various contents which are input or set during execution of applications.

Specifically, the storage 140 may store data for constructing a stellar GUI provided on the display 110 and various UI screens provided according to a user's menu depth for the stellar GUI according to the one exemplary embodiment.

The storage 140 may also store data such as various types of user interactions, functions relevant to the user interactions, information provided for the user interactions and the like.

Other various software modules stored in the storage 140 will be described with reference to FIG. 3.

Figure 3:
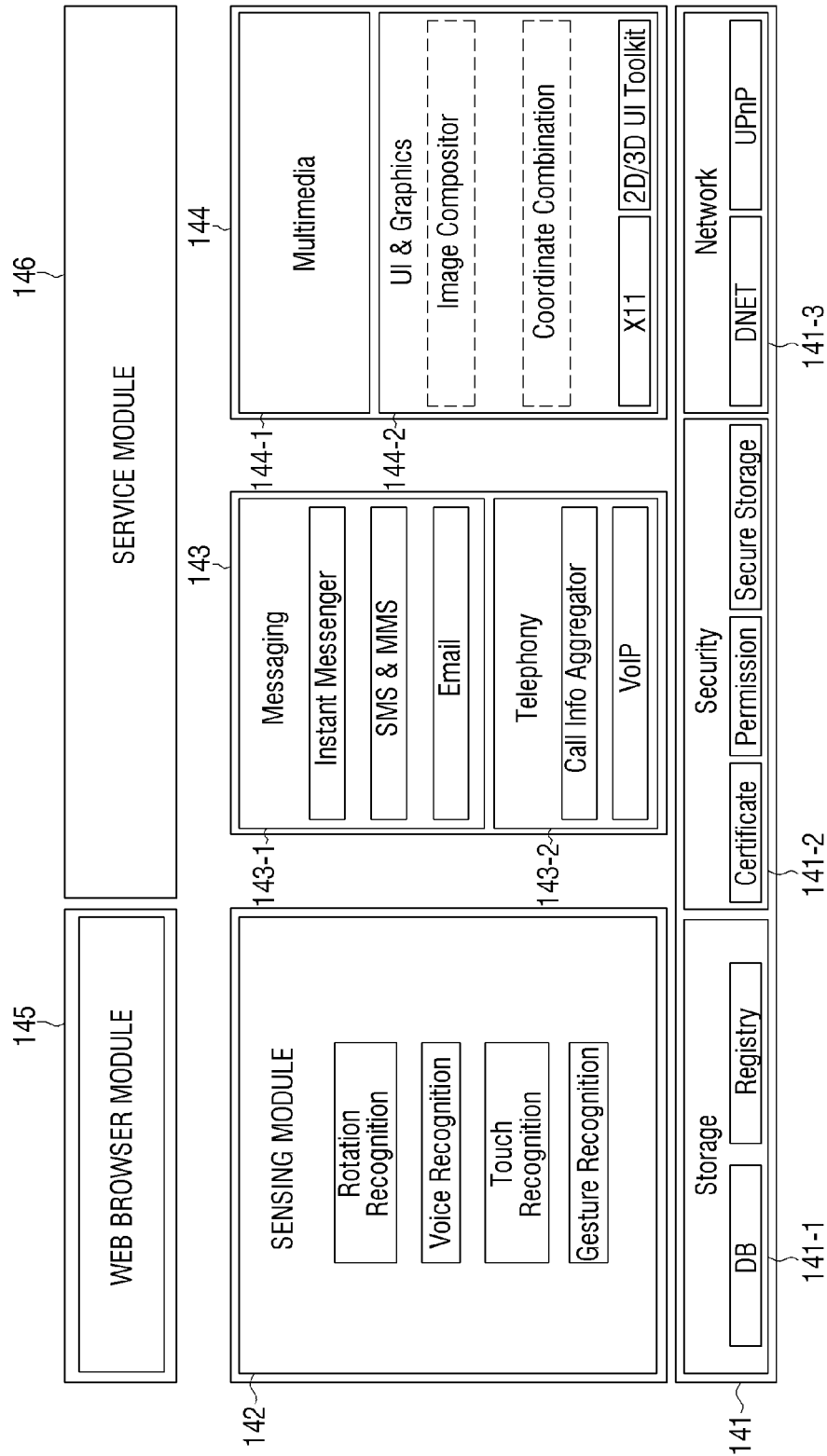
FIG. 3 is a view illustrating various software modules stored in a storage unit in accordance with one exemplary embodiment.

Referring to FIG. 3, the storage 140 may store software, which includes a base module 141, a sensing module 142, a communication module 143, a presentation module 144, a web browser module 145 and a service module 146.

The base module 141 denotes a basic module which processes a signal transferred from each hardware included in the display apparatus 100 and forwards the processed signal to an upper layer module. The base module 141 may include a storage module 141-1, a security module 141-2 and a network module 141-3. The storage module 141-1 may be a program module which manages a database (DB) or a registry. The main CPU 133 may access the database within the storage 140 using the storage module 141-1 to read out various data. The security module 141-2 may be a program module which supports hardware certification, request permission, secure storage and the like. The network module 141-3 may be a module for supporting network connection, and include a DNET module, a UPnP module and the like.

The sensing module 142 may be a module which collects information from a variety of sensors, and analyze and manage the collected information. The sensing module 142 may include a head orientation recognition module, a face recognition module, a voice recognition module, a motion recognition module, an NFC recognition module and the like.

The communication module 143 may be a module which executes communication with the exterior. The communication module 143 may include a messaging module 143-1, such as a messenger program, short message service (SMS) & multimedia message service (MMS) programs, an e-mail program and the like, and a call module 143-2 including a call information aggregator (call Info aggregator) program module, a VoIP module and the like.

The presentation module 144 may be a module which configures a display screen. The presentation module 144 may include a multimedia module 144-1 for playing back and outputting multimedia contents, and a UI rendering module 144-2 for executing UI and graphic processing. The multimedia module 144-1 may include a player module, a camcorder module, a sound processing module and the like. Accordingly, the multimedia module 144-1 may execute an operation of playing back various types of multimedia contents to generate and playback images on the screen and sound. The UI rendering module 144-2 may include an image compositor module which composes images, a coordinate combination module which combines and generates coordinates on a screen for displaying an image, an X11 module which receives various events from hardware, and a 2D/3D UI tool kit which provides tools for configuring a UI in a 2D or 3D form.

The web browser module 145 refers to a module which executes web browsing to access a web server. The web browser module 145 may include various modules, such as a web view module which configures a webpage, a download agent module which executes downloading, a bookmark module, a webkit module and the like.

The service module 146 may be a module which includes various types of applications for providing various services. In detail, the service module 146 may include a variety of program modules, such as an SNS program, a contents playback program, a game program, an e-book program, a calendar program, an alarm managing program, other widgets and the like.

FIG. 3 illustrates various program modules, but the illustrated various program modules may be partially omitted, varied or added depending on the type and characteristic of the display apparatus 100. A location-based module, which supports location-based services in cooperation with hardware such as a Global Positioning System (GPS) chip may further be included.

The communication unit 150 may communicate with an external device according to various types of communication methods.

The communication unit 150 may include various communication chips, such as a WiFi chip 151, a Bluetooth chip 152, a wireless communication chip 153 and the like. The WiFi chip 151 and the Bluetooth chip 152 may execute communications according to a WiFi communication method and a Bluetooth communication method, respectively. Upon using the WiFi chip 151 or the Bluetooth chip 152, the communication unit 150 may transmit/receive various types of connection information, such as an SSID, a session key and the like, and transmit/receive various information after communication is connected using such various information. The wireless communication chip 153 refers to a chip which executes communication according to various communication standards, such as IEEE, ZigBee, third generation (3G), third generation partnership project (3GPP), long term evolution (LTE) and the like. Besides, the communication unit 150 may further include a near field communication (NFC) chip, which operates according to an NFC method using 13.56 MHz band among various RF-ID frequency bands, such as 135 kHz, 13.56 MHz, 433 MHz, 860~960 MHz, 2.45 GHz and the like.

Specifically, the communication unit 150 may execute communication with a contents or service providing server (not shown), various information providing servers (not shown) and the like, so as to receive content-related information which a cubic GUI included in a stellar GUI represents, and various types of information for deciding a size and an alignment state of the cubic GUI. As one example, the communication unit 150 may execute communication on an SNS service providing screen with an SNS server (not shown) to receive a plurality of user information (for example, profile photos, etc.) represented by each cubic GUI or to receive relevant information between users for deciding the size and alignment state of the cubic GUI. As another example, the communication unit 150 may execute communication on a contents providing screen with a contents providing server (not shown) to receive content-related information represented by each cubic GUI or relevant information between contents.

The audio processor 160 may be a component which processes audio data. The audio processor 170 may execute various processing, such as decoding or amplifying of audio data, noise filtering and the like.

Especially, when a stellar GUI is rotating as a user moves according to one exemplary embodiment, the audio processor 160 may process audio data to provide sound corresponding to the user's moving speed. For example, the audio processor 160 may generate and provide a feedback sound corresponding to the user's moving speed.

The video processor 170 may be a component which processes video data. The video processor 170 may execute various image processing, such as decoding of video data, scaling, noise filtering, frame rate conversion, resolution change and the like.

The speaker 180 may be a component which outputs not only various audio data processed by the audio processor 160 but also various alarm sounds or voice messages.

The button 181 may be various types of buttons, such as a mechanical button, a touchpad, a wheel and the like, which are formed on a predetermined area of a front, side or rear of an appearance of a main body of the display apparatus 100. For example, a button for turning on or off the display apparatus 100 may be provided.

The camera 182 may be a component which captures a still image or a video according to a user control. Specifically, the camera 182 may capture various user motions for controlling the display apparatus 100.

The microphone 183 may be a component for receiving a user's voice or other sounds, and convert the received sound into audio data. The controller 130 may use the user's voice input through the microphone 183 during a connected call, or convert the user's voice into audio data and store the audio data in the storage 140. The camera 182 and the microphone 183 may configure a part of the user interface 120 according to their individual functions.

When the camera 182 and the microphone 183 are provided, the controller 130 may execute a control operation according to a user's voice input through the microphone 183 or a user's motion recognized by the camera 182. That is, the display apparatus 100 may operate in a motion control mode or a voice control mode. In the motion control mode, the controller 130 of the display apparatus 100 may activate the camera 182 to capture an image of the user, and trace the change of the user's motion, and execute a relevant control operation. In the voice control mode, the controller 130 may operate in a voice recognition mode of analyzing the user's voice input through the microphone 183 and executing a control operation according to the analyzed user's voice.

In the motion control mode, the controller 130 may determine a rotating or a moving direction of a head of a user, rotating or the moving direction of the eyes of the user, a hand motion, and the like of the user, and execute corresponding functions.

For example, when the stellar GUI is rotated based on an eye tracking, the controller 130 may identify eye images from a user image captured by the camera 182 using a face modeling. Here, the face modeling is an analysis process of processing a facial image obtained by a capturing element and converting the processed image into digital information for transmission, and may use one of an active shape modeling (ASM) and an active appearance modeling (AAM). The controller 130 may determine a movement of each eye of the user based on the identified eye image, and rotate the stellar GUI in response to the movement of the user's eye. For example, after scanning the user's captured image by a pixel unit to detect coordinate values of a pixel corresponding to a location of a user's left eye and coordinate values of a pixel corresponding to a user's right eye, a shifted state of a location of each eye may be determined. The method of scanning the user's image captured by the camera by the pixel unit and detecting the locations of the eyes based on the pixel coordinate values of the locations of the user's eyes may be implemented by using various image analyzing schemes which are well known. Thus, detailed description thereof will be omitted. As the method of detecting the locations of the user's eyes, an infrared (IR) sensor or the like, other than the camera, may also be used.

Besides, the display apparatus 100 may further include a variety of external input ports for connection with various external terminals, such as a headset, a mouse, a LAN and the like.

Although not shown, the display apparatus 100 may further include a feedback element (not shown). The feedback element (not shown) may provide various types of feedbacks (for example, audio feedback, graphic feedback, haptic feedback, etc.) according to a UI screen displayed. Specifically, when a stellar GUI is rotated, the feedback element may provide a sound feedback corresponding to a rotation speed. When a predetermined cubic room or cubic GUI is selected, the feedback element may provide a sound feedback for obtaining the user's attention.

FIG. 2B exemplarily illustrates the detailed configuration of the display apparatus 100. Depending on exemplary embodiments, some of components included in FIG. 2B may be omitted or changed and other components may further be included. For example, when the display apparatus 100 is a mobile phone, the display apparatus 100 may further include a global positioning system (GPS) receiver (not shown) to receive a GPS signal from a GPS satellite to calculate a current location of the display apparatus 100, a digital multimedia broadcasting (DMB) receiver (not shown) to receive and process a DMB signal, and the like.

FIGS. 4A to 4C are views of a stellar GUI in accordance with an exemplary embodiment.

As illustrated in FIG. 4A, a UI screen provided on the display apparatus 100 according to an exemplary embodiment may include 3D spaces 410 to 450 each in a form of a room, and a rotatable stellar GUI 400. In detail, the plurality of rooms 410 to 450 may be connected to one another through a path area 50, and each of the rooms 410 to 450 may correspond to a different category.

Each room may display thereon corresponding category information. For example, each room 410, 420, 430, 440, and 450 may display at least one of a symbol 411, 421, 431, 441, and 451 which corresponds to a particular category, and brief text information 412, 422, 432, 442, and 452 related to the category. The categories, as illustrated, may be classified into an "ON TV" category of watching TV in real time, a "Movies & TV Shows" category for providing VOD contents, a "Social" category of sharing SNS contents, an "application" category of providing applications, a "Music, Photos & Clips" category of providing personal contents, and the like. This classification is merely illustrative, and the classification of categories may be carried out based on various standards.

When a predetermined room is pointed to or selected, information 412 indicating the corresponding room may be displayed in a highlighted manner to indicate that the corresponding room has been pointed.

Referring to FIG. 4B, the room may be displayed by being rotated in response to a user interaction. That is, a room located at the center of the GUI may be pointed to due to the rotation. In this state, the room may be selected according to a preset event to be displayed on an entire screen, and a cubic GUI included in the room may be output. However, this is merely illustrative. According to another example, a pointing GUI, namely, the highlighted function may be shifted in response to a user interaction.

Referring to FIG. 4C, when the number of categories provided on the display apparatus 100 exceeds the number of rooms, information 10 relating to the number of categories exceeded may be displayed. For example, only the number of categories exceeded may be displayed but this is merely illustrative. Detailed information related to the exceeded categories, for example, symbols or text information representing such categories may also be provided.

FIGS. 5A, 5B, and 5C are views of a stellar GUI in accordance with another exemplary embodiment.

As illustrated in FIG. 5A, a stellar GUI 400 may be displayed with a partial area enlarged in response to a rotation interaction.

For example, of the five rooms 410 to 450 constructing the stellar GUI 400 illustrated in FIG. 4A, the upper three rooms 410, 420 and 450 may be displayed in an enlarged state while the lower two rooms 430 and 440 are not displayed.

As illustrated in FIG. 5B, when the stellar GUI 400 is rotated in response to the rotation interaction, the three rooms 430, 440 and 450 may be displayed and the other two rooms 410 and 420 may not be displayed.

As illustrated in FIG. 5C, when the number of categories provided on the display apparatus 100 exceeds the number of rooms, a new category space may be displayed as the stellar GUI 400 is rotated. That is, the categories provided may not be limited to the number of rooms but infinite categories may be provided responsive to the rotation of the stellar GUI 400.

For example, referring to FIG. 5C, rooms 460 and 470 for providing new categories may be displayed. Even in this case, the same corresponding category information 461, 462, 471 and 472 may be provided.

The exemplary embodiment of FIG. 5A has illustrated that the symbols 411 to 451 or text information 412 to 452 representing the respective categories are displayed even when a partial area is enlarged according to the rotation interaction. However, it is merely illustrative. According to another exemplary embodiment, when a partial area is enlarged, a cubic GUI indicating a content included in each category may be displayed.

FIGS. 6A and 6B are views of a stellar GUI according to another exemplary embodiment.

As illustrated in FIG. 6A, the stellar GUI 400 provided on the display apparatus 100 may include a user icon 20 which indicates the user of the display apparatus. The user may select a desired category by controlling the movement of the user icon 20.

In detail, referring to FIG. 6B, the user may shift the user icon 20 to a desired room (for example, 410) using a user motion or the remote controller 200. For example, when the stellar GUI is driven, the user icon 20 may be disposed on the path area 50 connected to the plurality of rooms 410 to 450, and a motion such as walking into the room may be provided according to the user interaction. Consequently, the room 410 in which the user icon 20 has walked may be selected.

FIGS. 7A and 7B are views illustrating a UI screen provided when a predetermined room is selected on the UI screen.

For the sake of explanation, FIG. 6B illustrates an example that the room 410 in which the user icon 20 has walked is selected.

When the user icon 20 is moved up to the room 410, referring to FIG. 7A, a plurality of cubic GUIs 411 to 419 may be displayed floating in a 3D space. The 3D space may be space (a cubic room) in a form of a room defined by three walls 410-2, 410-3, and 410-4, which are aligned along an X-axis and have predetermined depths in a Z-axis on the screen, a ceiling 410-1 and a floor 410-5.

As illustrated, the plurality of cubic GUIs 411 to 419 may indicate predetermined objects. In detail, the plurality of cubic GUIs 411 to 419 may indicate various objects belonging to a category corresponding to the cubic room. For example, when the cubic room corresponds to a VOD content-based category, the plurality of cubic GUIs 411 to 419 may indicate various content providers which provide the VOD contents. However, this is merely illustrative. A plurality of cubic GUIs may also indicate contents (for example, predetermined VOD contents) provided by each contents provider according to a menu depth carried out according to a user's command.

The plurality of cubic GUIs 411 to 419 may be displayed with different sizes and aligned states. The sizes and aligned states of the cubic GUIs 411 to 419 may depend on priorities which are set based on at least one of a user's motion pattern and an attribute of an object. In detail, when a content with a high priority, for example, a user's preference is used as a reference, a cubic GUI 411 indicating a user's favorite contents provider may be displayed on a center of a screen to be greater in size and smaller in depth than the other cubic GUIs. That is, the plurality of cubic GUIs 411 to 419 may be displayed to reflect a user's preference for an object, and accordingly, the user's recognition with respect to the corresponding cubic GUI 411 may increase. The other cubic GUIs 412 to 419 may be displayed to have different sizes, locations and depths according to corresponding preferences.

Referring to FIG. 7B, a pointing GUI 30 may be displayed on the cubic GUI 411 indicating an object with a high priority. The pointing GUI 30 may navigate the plurality of cubic GUIs, and may be provided in a form of a highlight pointer. However, this is merely illustrative. The pointing GUI may be changeable to various shapes (forms), such as an arrow-shaped pointer, a hand-shaped pointer and the like.

The pointing GUI 30 may be moved according to various types of user commands. For example, the pointing GUI 30 may be moved to another cubic GUI according to various user commands, such as a motion command in a pointing mode of the remote controller 200, a motion command in a gesture mode of the remote controller 200, a voice command, a command to manipulate a navigation key provided on the remote controller 200, a head tracking (or eye tracking) and the like.

FIGS. 8A and 8B are views illustrating a stellar GUI according to a user authentication in accordance with another exemplary embodiment.

As illustrated in an upper drawing of FIG. 8A, when a stellar GUI is driven, a stellar GUI 800 including a plurality of cubic rooms 810, 820, 830, 840, and 850 may be displayed, but cubic GUIs included in each cubic room 810 to 850 may be displayed without representing any information.

An authentication UI 40 for carrying out user authentication may be provided. In detail, a UI for inputting a user ID and password may be displayed.

Afterwards, when the user authentication is executed, a stellar GUI 800' corresponding to the authenticated user may be displayed. That is, the stellar GUI 800' representing information related to each category and content-related information included in the category may be displayed. This may allow the user to configure the stellar GUI into his/her desired form for use.

The above exemplary embodiment is merely illustrative. A stellar GUI corresponding to each user may also be provided merely based on identification information, without the user authentication.

For example, referring to FIG. 8B, icons 61 to 64 indicating each user may be displayed. When a user selects a predetermined icon, a stellar GUI corresponding to the selected icon may be provided. That is, when family members open their stellar GUIs, each stellar GUI may be provided merely in response to selection of a corresponding icon, without a separate authentication procedure.

The exemplary embodiment of FIG. 8 has illustrated that an authentication screen or a user identification icon is displayed after a stellar GUI is displayed. However, the authentication screen or the user identification icon may also be displayed prior to the stellar GUI being displayed.

FIGS. 9A and 9B are views illustrating a method of selecting a content in accordance with another exemplary embodiment.

As illustrated in FIG. 9A, a plurality of screens 961 to 963 may be displayed on a first area of a screen and a stellar GUI 900 may be displayed on a second area of the screen according to a user interaction. The stellar GUI may be displayed in a manner that a cubic GUI belonging to a category corresponding to each of a plurality of spaces 910 to 950 is included in each space.

Then, when a preset user interaction is input in a state that one of a plurality of cubic GUIs 931 has been pointed to or selected, a content corresponding to the selected cubic GUI may be displayed on one of a plurality of screens. The preset user interaction may be a user interaction of selecting one of a plurality of buttons, which are provided on a remote control and correspond to the plurality of screens, respectively. For example, the plurality of buttons provided on the remote control may have the same shape as the shape of each screen. However, the exemplary embodiments may not be limited to this. Other user interactions, such as user motions including a head tracking, an eye tracking and a hand motion, voice recognition and the like may also be input, but detailed description thereof will be omitted.

FIG. 9B illustrates that a content selection is completed and different contents are played back on a plurality of screens, respectively. As illustrated in FIG. 9B, a content corresponding to the cubic GUI 931 selected in FIG. 9A may be played back on a second screen 962 of first to third screens 961 to 963. However, this is merely illustrative. Depending on the content selection, more than three screens may also be displayed.

Although not shown, according to another exemplary embodiment, the selection of contents to be played back on the screen may also be available when one cubic room is displayed as a main room. For example, with a predetermined cubic GUI pointed to or selected, one of a plurality of buttons corresponding to a plurality of screens disposed on the remote control may be pressed so as to playback the pointed content on the selected screen.

FIG. 10 is a view of a guide GUI in accordance with another exemplary embodiment.

As illustrated in FIG. 10, a guide GUI 1010 for guiding an operation state of a stellar GUI may be displayed on the display apparatus 100. The guide GUI 1010 may be an animation image that a symbolic shape of the stellar GUI is rotating. The guide GUI 1010 may be displayed in a different shape, in a sense that each room indicates a different category. The guide GUI 1010 may correspond to a case that a user interaction of driving the stellar GUI is input. However, the guide GUI is not limited thereto. For example, when a user interaction is not received for more than a preset time after the stellar GUI is driven, namely, when a stand-by time is continued for more than a preset time, the corresponding guide GUI may be displayed. However, this is merely illustrative. The guide GUI may also be displayed in a form that each room has the same form.

FIG. 11 is a flowchart illustrating a method of providing a UI screen in accordance with an exemplary embodiment.

According to the UI screen providing method illustrated in FIG. 11, a plurality of spaces corresponding to different categories, respectively, may be provided and a rotatable GUI (hereinafter, referred to as a stellar GUI) may be displayed (operation S1110). The categories may include at least one of a category of watching TV in real time, a category based on VOD content, a category based on the sharing of SNS content, a category of providing an application, and a category of personal content. However, the categories may not be limited to those categories.

When a first user interaction is received, the stellar GUI may be displayed by being rotated according to the user interaction (operation S1120).

Afterwards, when one of the plurality of spaces is selected according to a second user interaction (operation S1130:Y), the selected space may be displayed as a main space and at least one content included in a category corresponding to the selected space may be displayed (operation S1140). The at least one content included in the category corresponding to the selected space may be provided in a form of a polyhedron.

The stellar GUI may include a path area located in a center of the GUI, and a plurality of spaces in a form of a cube, which are connected to one another through the path area and spaced from one another while surrounding the path area.

The stellar GUI may also include at least one icon indicating at least one content included in categories corresponding to the plurality of spaces, respectively.

The plurality of screens may be displayed on a first area and the stellar GUI may be displayed on a second area according to a preset event. Only a partial area (for example, some rooms) of the stellar GUI may be displayed. Afterwards, when at least one icon included in the stellar GUI is selected, a content corresponding to the selected icon may be played back on one of the plurality of screens.

Also, a guide GUI for guiding an operation state of the stellar GUI may be displayed according to a preset event. The guide GUI may be an animation UI that a symbolic shape of the stellar GUI is rotating.

FIG. 12 is a flowchart illustrating a UI screen providing method according to another exemplary embodiment.

According to the UI screen providing method illustrated in FIG. 12, a plurality of spaces corresponding to different categories, respectively, may be provided and a rotatable GUI, namely, the stellar GUI may be displayed (operation S1210).

A user authentication screen may then be displayed (operation S1220).

Afterwards, at least one of a category and content included in the category may be displayed differently according to user information input on the user authentication screen (operation S1230).

That is, since each user may prefer different categories and different contents, a stellar GUI including the corresponding preferences may be provided.

A stellar GUI according to one exemplary embodiment may be implemented in a form of an application, which is software directly used by the user of the OS. Also, an application may be provided in, but not limited to, a form of an icon interface on a screen of the display apparatus 100.

As described above, a different information, function or service may be provided merely according to a user interaction. This may result in improvement of user convenience.

The control method for the display apparatus according to the foregoing exemplary embodiments may be implemented as computer-executable program codes and stored in various non-transitory computer readable media. The program codes may then be provided to each server or device to be executed by a processor.

As one example, a non-transitory computer readable medium in which a program executing a step of providing a plurality of spaces corresponding to different categories and receiving a user interaction with respect to a rotatable GUI, and a step of providing a selected one space as a main space, when the one of the plurality of spaces is selected as the GUI is rotated responsive to the received user interaction, to generate a UI screen providing at least one content included in a category corresponding to the selected space is stored may be provided.

The non-transitory computer readable medium is a medium storing data semi-permanently, not a medium storing data for brief moment such as a register, cash, or a memory etc., and also a medium which is readable by a gadget. Specifically, various applications and programs described above may be provided by being stored in the non-transitory computer readable medium such as a CD, a DVD, a hard disk, a Bluray disk, an USB, a memory card, a ROM, etc.

Also, the foregoing exemplary embodiments have been illustrated, but the exemplary embodiments may not be limited to the aforementioned exemplary embodiments. Those skilled in the art will appreciate that various modifications, additions and substitutions are possible, without departing from essential characteristics of the exemplary embodiments, and those modifications and additions should not be construed individually from the technical scope or aspects of the exemplary embodiments.

What is claimed is:

1. A display apparatus comprising:
   a display configured to display a rotatable Graphic User Interface (GUI) which has a plurality of spaces in a form of a polyhedron, each of the plurality of spaces corresponding to a different information category;

a user interface configured to receive a user interaction for the GUI; and a controller configured to, when one of the plurality of spaces in the form of the polyhedron is selected according to the received user interaction, control to display the selected space as a main space, and display at least one content-related information included in a category corresponding to the selected space, wherein the rotatable GUI comprises a path area disposed in a center of the GUI, and the plurality of spaces, each in a form of a cube, are connected to each other surrounding the path area, and spaced apart from each other.

2. The apparatus of claim 1, wherein the rotatable GUI comprises at least one icon which represents the at least one content-related information included in the category corresponding to the plurality of spaces in the form of the polyhedron respectively.

3. The apparatus of claim 2, wherein the controller displays a plurality of screens on a first area of a main screen of the display apparatus, and the rotatable GUI on a second area of the main screen according to a predetermined event, and when at least one icon included in the GUI is selected, controls to playback a content corresponding to the selected icon on one of the plurality of screens.

4. The apparatus of claim 1, wherein the controller controls to display the at least one content-related information included in the category corresponding to the selected space as the GUI in the form of the polyhedron.

5. The apparatus of claim 1, wherein the controller controls to display a guide

GUI which guides an operation state of the GUI according to a predetermined event.

6. The apparatus of claim 5, wherein the guide GUI is an animation user interface (UI) in which a symbolic shape of the GUI rotates.

7. The display apparatus of claim 1, wherein the controller controls to display a user authentication screen, and display differently at least one of category information and the at least one content-related information included in each category according to user information which is input through the user authentication screen.

8. The apparatus of claim 1, wherein the different category comprises at least one of a category of watching television (TV) in real time, a category based on video on demand (VOD) content, a category based on sharing of Simple Notification Service (SNS) content, a category of providing an application, and a category of personal content.

9. A method of providing a user interface (UI) screen of a display apparatus, the method comprising:

displaying a rotatable Graphic User Interface (GUI) which has a plurality of spaces in a form of a polyhedron, each of the plurality of spaces corresponding to a different information category;

receiving a user interaction for the GUI; and when one of the plurality of spaces in the form of the polyhedron is selected, according to the received user interaction, displaying the selected space as a main space, and displaying at least one content-related information included in a category corresponding to the selected space wherein the rotatable GUI comprises a path area disposed in a center of the GUI, and the plurality of spaces, each in a form of a cube, are connected to each other surrounding the path area, and spaced apart from each other.

10. The method of claim 9, wherein the rotatable GUI comprises at least one icon which represents the at least one content-related information included in the category corresponding to the plurality of spaces in the form of the polyhedron respectively.

11. The method of claim 10, further comprising:

displaying a plurality of screens on a first area of a main screen of the display apparatus, and the rotatable GUI on a second area of the main screen according to a predetermined event; and when at least one icon included in the GUI is selected, playing back a content corresponding to the selected icon on one of the plurality of screens.

12. The method of claim 9, wherein the displaying comprises displaying at least one content-related information included in the category corresponding to the selected space as the GUI in the form of the polyhedron.

13. The method of claim 9, further comprising:

displaying a guide GUI which guides an operation state of the GUI according to a predetermined event.

14. The method of claim 13, wherein the guide GUI is an animation user interface (UI) in which a symbolic shape of the GUI rotates.

15. The method of claim 9, further comprising:

displaying a user authentication screen, and the displaying comprises displaying differently at least one of category information and the at least one content-related information included in each category according to user information which is input through the user authentication screen.

16. The method of claim 9, wherein the different category comprises at least one of a category of watching television (TV) in real time, a category based on video on demand (VOD) content, a category based on sharing of Simple Notification Service (SNS) content, a category of providing an application, and a category of personal content.

17. A method of providing a UI screen of a display apparatus, the method comprising:

displaying a rotatable Graphical User Interface (GUI) which has a plurality of spaces in a form of a polyhedron, wherein each of the plurality of spaces comprises a first wall, a second wall and a third wall, wherein each of the plurality of spaces corresponds to a different category of information and, wherein the rotatable GUI comprises a path area disposed in a center of the GUI, and the plurality of spaces, each in a form of a cube, are connected to each other surrounding the path area, and spaced apart from each other.

18. The method of claim 17, wherein the polyhedron is star-shaped.

19. The method of claim 17, wherein the categories of information comprises at least one of real-time television (TV) shows, video on demand (VOD) content, Simple Notification Service (SNS) content, an application, and personal content.

* * * * *